United States Patent
Park et al.

(10) Patent No.: US 11,262,982 B2
(45) Date of Patent: Mar. 1, 2022

(54) COMPUTATION CIRCUIT INCLUDING A PLURALITY OF PROCESSING ELEMENTS COUPLED TO A COMMON ACCUMULATOR, A COMPUTATION DEVICE AND A SYSTEM INCLUDING THE SAME

(71) Applicants: SK hynix Inc., Gyeonggi-do (KR); SK Telecom Co., Ltd., Seoul (KR)

(72) Inventors: Yong Sang Park, Gyeonggi-do (KR); Seok Joong Hwang, Seoul (KR)

(73) Assignees: SK hynix Inc., Gyeonggi-do (KR); SK Telecom Co., Ltd., Seoul (KR)

( * ) Notice: Subject to any disclaimer, the term of this patent is extended or adjusted under 35 U.S.C. 154(b) by 224 days.

(21) Appl. No.: 16/518,391

(22) Filed: Jul. 22, 2019

(65) Prior Publication Data

US 2020/0026497 A1    Jan. 23, 2020

(30) Foreign Application Priority Data

Jul. 23, 2018  (KR) ......................... 10-2018-0085503
Jul. 17, 2019  (KR) ......................... 10-2019-0086523

(51) Int. Cl.
   *G06F 7/544*    (2006.01)

(52) U.S. Cl.
   CPC ................... *G06F 7/5443* (2013.01)

(58) Field of Classification Search
   CPC ..................................................... G06F 7/5443
   See application file for complete search history.

(56) References Cited

U.S. PATENT DOCUMENTS

| | | | |
|---|---|---|---|
| 6,247,036 B1 * | 6/2001 | Landers .............. | G06F 9/30003 708/603 |
| 7,822,799 B1 * | 10/2010 | Langhammer .......... | G06F 7/509 708/551 |
| 9,647,667 B1 * | 5/2017 | Perry .................. | G06F 13/4234 |
| 9,805,303 B2 | 10/2017 | Ross et al. | |
| 2016/0358069 A1 * | 12/2016 | Brothers ................ | G06F 7/764 |

* cited by examiner

*Primary Examiner* — Michael D. Yaary
(74) *Attorney, Agent, or Firm* — IP & T Group LLP

(57) ABSTRACT

A computation circuit includes a plurality of processing elements and a common accumulator. The plurality of processing elements are sequentially coupled in series, and performs a multiply and accumulate (MAC) operation on a weight signal and at least one of two or more input signals received in each unit cycle. The common accumulator is sequentially and cyclically coupled to first to Kth processing elements among the plurality of processing elements, and configured to receive a computation value outputted from a processing element coupled thereto among the first to Kth processing elements, and store computation information. The K is decided based on values of the two or more input signals and the number of guard bits included in one processing element.

20 Claims, 11 Drawing Sheets

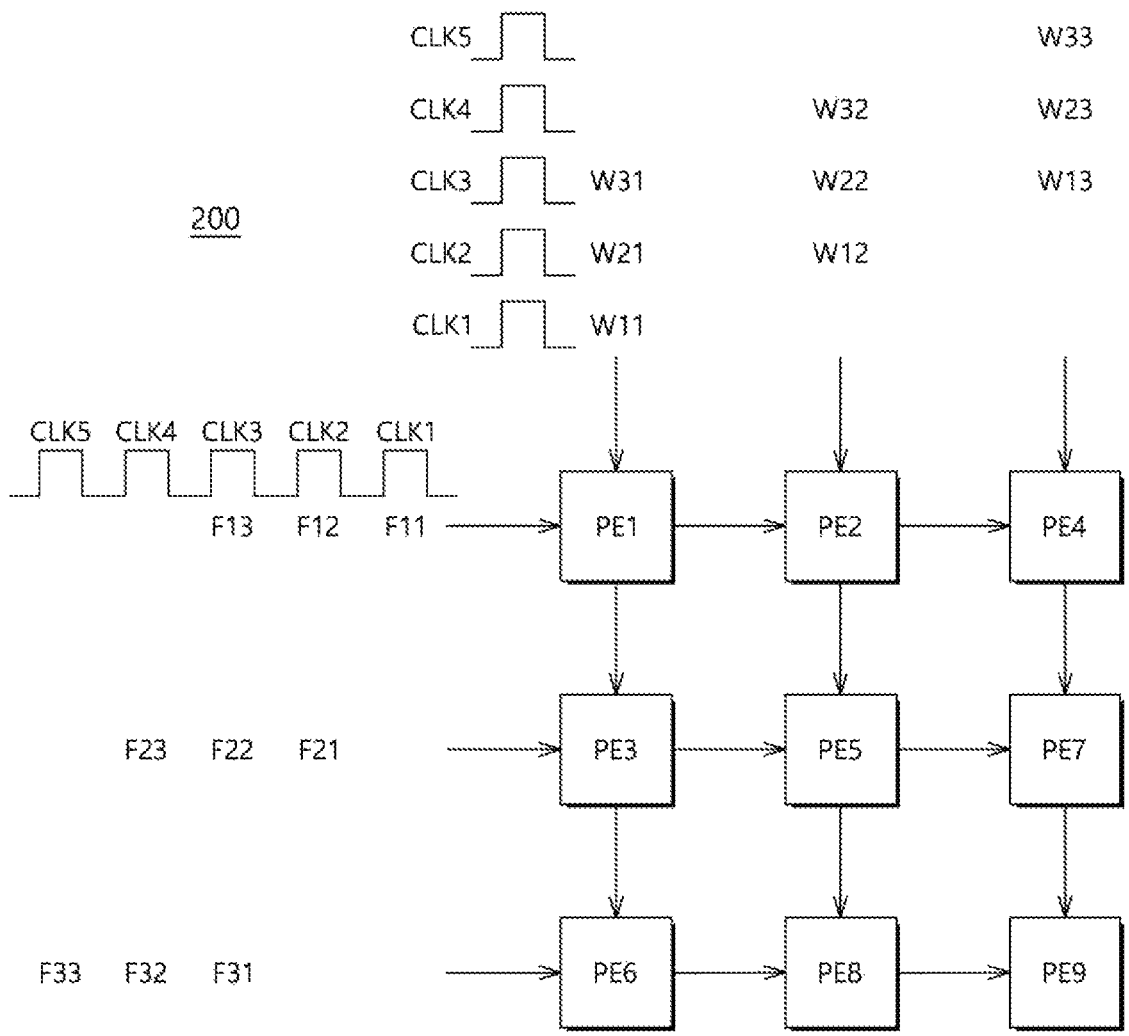

FIG.2B $$FD = \begin{bmatrix} F11 & F12 & F13 \\ F21 & F22 & F23 \\ F31 & F32 & F33 \end{bmatrix} \quad WD = \begin{bmatrix} W11 & W12 & W13 \\ W21 & W22 & W23 \\ W31 & W32 & W33 \end{bmatrix}$$

$$FD \times WD = \begin{bmatrix} F11W11 + F12W21 + F13W31 & F11W12 + F12W22 + F13W32 & F11W13 + F12W23 + F13W33 \\ F21W11 + F22W21 + F23W31 & F21W12 + F22W22 + F23W32 & F21W13 + F22W23 + F23W33 \\ F31W11 + F32W21 + F33W31 & F31W12 + F32W22 + F33W32 & F31W13 + F32W23 + F33W33 \end{bmatrix}$$

COMPUTATION CIRCUIT INCLUDING A PLURALITY OF PROCESSING ELEMENTS COUPLED TO A COMMON ACCUMULATOR, A COMPUTATION DEVICE AND A SYSTEM INCLUDING THE SAME

CROSS-REFERENCE TO RELATED APPLICATIONS

The present application claims priority under 35 U.S.C. § 119(a) to Korean patent application number 10-2018-0085503, filed on Jul. 23, 2018, and to Korean patent application number 10-2019-0086523, filed on Jul. 17, 2019, which are incorporated herein by reference in their entirety.

BACKGROUND

1. Technical Field

Various embodiments generally relate to an integrated circuit technology, and more particularly, to a computation circuit and a system including the same.

2. Related Art

With the progress of the fourth industrial revolution, technologies related to Internet of things, mobile, cloud, big data and artificial intelligence are continuously developing. In order to implement artificial intelligence, techniques such as machine learning and deep learning have been developed. Machine learning and the deep learning are similar to each other in that both techniques compute or classify received inputs and generate an output. However, machine learning may analyze and infer data through algorithms inputted by human beings, whereas deep learning may analyze and infer data through a deep neural network.

A deep neural network circuit, which generates an output by computing received inputs, may include a matrix operation circuit that generates an output by performing a multiply and accumulate (MAC) operation on received inputs. The matrix operation circuit may perform a convolution operation and may generally include a systolic array. The systolic array may generate an output by performing a MAC operation on an input feature and a weight input such as activation inputs.

SUMMARY

In an embodiment, a computation circuit may include a plurality of processing elements and a common accumulator. The plurality of processing elements may be sequentially coupled in series, and configured to perform a MAC operation on a weight signal and at least one of two or more input signals received in each unit cycle. The common accumulator may be sequentially and cyclically coupled to first to Kth processing elements among the plurality of processing elements, and configured to receive a computation value outputted from a processing element among the first to Kth processing elements, and store computation information including the computation value. The K may be determined based on values of the two or more input signals and the number of guard bits corresponding to one processing element.

In an embodiment, a computation circuit may include a plurality of processing elements and a common accumulator. The each of the plurality of processing elements may be configured to receive at least one of two or more input signals in each unit cycle, and perform a multiply and accumulate (MAC) operation on a weight signal and at least one of the two or more input signals to generate a computation value. The common accumulator may be configured to store computation values generated by the plurality of processing elements as plural pieces of computation information, respectively, coupled to each of the plurality of processing elements in each unit cycle in which the number of accumulations in the corresponding processing element reaches a threshold value, and configured to update computation information related to one processing element among the plurality of processing elements by accumulating a computation value outputted from the one processing element and a value corresponding to the computation information related to the one processing element.

BRIEF DESCRIPTION OF THE DRAWINGS

FIGS. 2A and 2B are diagrams illustrating a configuration and computation operation of a computation circuit in accordance with an embodiment.

DETAILED DESCRIPTION

A computation circuit and a system including the same according to the present disclosure is described below with reference to the accompanying drawings through various embodiments. Throughout the specification, reference to "an embodiment" or the like is not necessarily to only one embodiment, and different references to any such term are not necessarily to the same embodiment(s).

Figure 1:
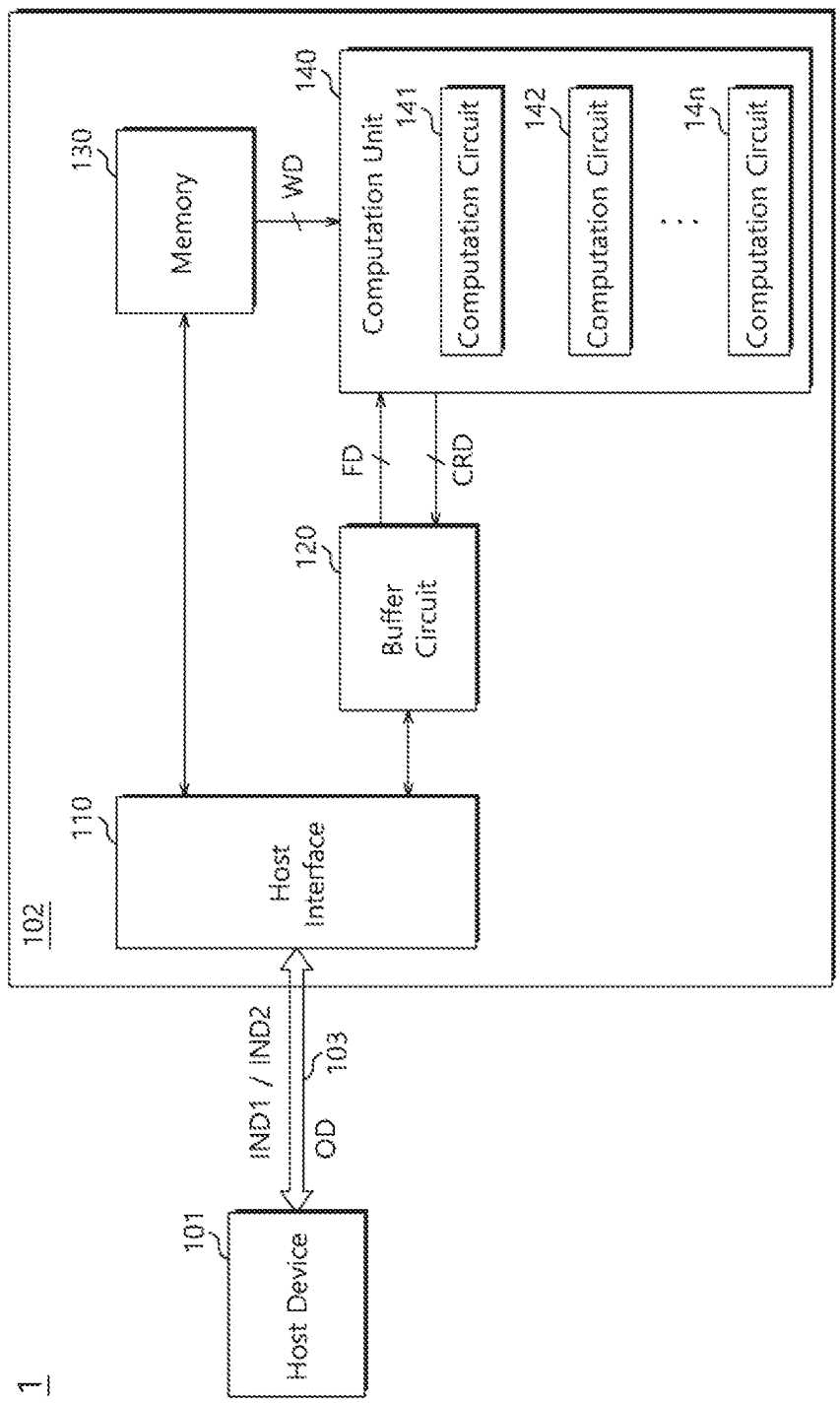
FIG. 1 is a diagram illustrating a configuration of a system in accordance with an embodiment.

FIG. 1 illustrates a configuration of a system 1 in accordance with an embodiment. In FIG. 1, the system 1 may include a host device 101 and a computation device 102. The host device 101 may provide data to the computation device 102, and receive data from the computation device 102. The host device 101 may be coupled to the computation device 102 through a system bus 103. The host device 101 may transfer input data IND1 and IND2 to the computation device 102 through the system bus 103. The host device 101 may receive output data OD through the system bus 103. The output data OD may be generated through a computation operation on the input data IND1 and IND2 by the computation device 102. The host device 101 may provide various control signals to the computation device 102 through the system bus 103 such that the computation device 102 can perform a computation operation. The input data may include first input data IND1 and second input data IND2. For example, the first input data IND1 may include information related to a set of input features. The second input data IND2 may include information related to weight data.

The computation device 102 may be coupled to the host device 101 through the system bus 103. The computation device 102 may receive the input data IND1 and IND2 from the host device 101 through the system bus 103. The computation device 102 may receive the input data IND1 and IND2, and perform a computation operation on the input data IND1 and IND2. The computation device 102 may transfer output data OD, which is generated by performing the computation operation, to the host device 101 through the system bus 103. The computation device 102 may be a neural network computation device. The computation device 102 may receive the first and second input data IND1 and IND2 from the host device 101, and perform a computation operation on a set of input features and a weight signal. The computation operation may include a convolution operation or a multiply and accumulation (MAC) operation on the set of input features and the weight signal.

The computation device 102 may include a host interface 110, a buffer circuit 120, a memory 130 and a computation component 140. The host interface 110 may be coupled to the system bus 103 to receive the input data IND1 and IND2 from the host device 101, and provide the received input data IND1 and IND2 to the internal circuits of the computation device 102. The host interface 110 may transfer the output data OD generated by the computation device 102 to the host device 101 through the system bus 103. The host interface 110 may receive the first and second input data IND1 and IND2 through the system bus 103. The host interface 110 may provide the received first input data IND1 to the buffer circuit 120, and provide the received second input data IND2 to the memory 130. The host interface 110 may receive computation data CRD from the computation component 140 through the buffer circuit 120. The host interface 110 may drive the system bus 103 to transfer the output data OD to the host device 101, based on the computation data CRD generated by the computation component 140.

The buffer circuit 120 may receive the first input data IND1 from the host interface 110. The buffer circuit 120 may classify the first input data IND1 into a plurality of input feature sets FD and store the plurality of input feature sets FD. Each of the input feature sets FD may include a plurality of features. Each of the features may indicate unit data of the input feature set FD, which can include a random number of bits. The system bus 103 may have a data bandwidth different from the size of one feature. The data bandwidth of the system bus 103 may be larger than the size of one feature. The first input data IND1 may be transferred through the system bus 103 in synchronization with a clock signal. The number of bits in the first input data IND1 transferred at a time through the system bus 103 may be larger than the number of bits in one feature. The first input data IND1 transferred at a time through the system bus 103 may include information on a plurality of features. Therefore, the buffer circuit 120 may classify the first input data IND1 into the plurality of input feature sets FD, and store the classified input feature sets FD. The buffer circuit 120 may provide the plurality of input feature sets FD to the computation component 140. The buffer circuit 120 may perform a batch operation to provide the plurality of input feature sets FD to the computation component 140 at the same time, in order to increase the computation efficiency of the computation component 140. The buffer circuit 120 may receive the computation data CRD generated through the computation operation by the computation component 140, and provide the computation data CRD to the host interface 110.

The memory 130 may receive the second input data IND2 from the host interface 110. The memory 130 may classify the second input data IND2 into the plurality of weight data WD, and store the classified weight data WD. The memory 130 may provide the plurality of weight data WD to the computation component 140. One weight data WD may include a plurality of weight signals. Each of the weight signals may indicate the unit data of the weight data WD, which can include a random number of bits. In an embodiment, the memory 130 may be a synchronous random access memory (SRAM) or a dynamic random access memory (DRAM).

The computation component 140 may receive the plurality of input feature sets FD from the buffer circuit 120 as an input signal. The computation component 140 may receive the plurality of weight data WD from the memory 130. The computation component 140 may perform a computation operation on the input feature sets FD and the weight data WD. For example, the computation component 140 may perform a convolution operation on the input feature sets FD and the weight data WD. The computation component 140 may include a plurality of computation circuits 141 to 14n. The plurality of computation circuits 141 to 14n may be MAC operation circuits having the same structure. Each of the computation circuits 141 to 14n may perform a computation operation on the input feature set FD and the weight data WD, and output the computation operation result to the host interface 110 through the buffer circuit 120. Each of the computation circuits 141 to 14n may include a plurality of processing elements. The plurality of processing elements may receive the input feature set FD and the weight data WD in synchronization with a clock signal, and perform a MAC operation on the received input feature set FD and the received weight data WD. Each of the computation circuits 141 to 14n may include a systolic array configured to perform a MAC operation on the input feature set FD and the weight data WD.

FIGS. 2A and 2B are diagrams illustrating a configuration and computation operation of a computation circuit 200 in accordance with an embodiment. In FIG. 2A, the computation circuit 200 may be a systolic array including a plurality of processing elements PE. The computation circuit 200 may be applied as each of the computation circuits 141 to 14n in FIG. 1. In FIG. 2A, the computation circuit 200 may receive three input feature sets each having three features as an input signal, and receive three weight data each having three weight signals. FIG. 2A illustrates that the computation circuit 200 includes nine processing elements PE1 to PE9 to perform a MAC operation on three input feature sets each having three features and three weight data each having three weight signals. However, the number of input feature sets, the number of features in one input feature set, the number of weight data, and the number of weight signals in one weight data may be smaller or larger than three. Thus, the number of the processing elements in the computation circuit 200 may also be decreased or increased.

The computation circuit 200 may include first to ninth processing elements PE1 to PE9. The processing elements PE1 to PE9 may sequentially receive the features and weight signals in the respective input feature sets and weight data in synchronization with a clock signal CLK defining unit cycles, and perform a MAC operation on the received features and weights. Each of the first to ninth processing elements PE1 to PE9 may include multiply logic, accumulation logic and a register. The first to ninth processing elements PE1 to PE9 may perform multiplications through the multiply logic and accumulations through the accumulation logic in parallel. FIG. 2B illustrates the input feature sets FD and the weight data WD, which are expressed as matrices, and a result FD×WD obtained by performing a convolution operation on the input feature sets FD and the weight data WD. Referring to FIGS. 2A and 2B, the operation of the computation circuit 200 will be described as follows.

When a first clock signal CLK1 toggles during a first unit cycle, the first processing element PE1 may receive a first feature F11 of a first input feature set and a first weight signal W11 of first weight data. The first processing element PE1 may generate F11W11 by multiplying the first feature F11 of the first input feature set by the first weight signal W11 of the first weight data. The first clock signal CLK1 may be a pulse signal that toggles in synchronization with a first clock cycle of the clock signal CLK. Similarly, second to ninth clock signal CLK2 to CLK9 may be pulse signals that toggle in synchronization with second to eight clock cycles of the clock signal CLK, respectively.

When the second clock signal CLK2 toggles during a second unit cycle, the first processing element PE1 may accumulate previously computed F11W11 and 0 and store the computation result. The first processing element PE1 may receive a second feature F12 of the first input feature set and a first weight signal W21 of second weight data. The first processing element PE1 may output the first feature F11 of the first input feature set to the second processing element PE2, and output the first weight signal W11 of the first weight data to the third processing element PE3. The first processing element PE1 may generate F12W21 by multiplying the second feature F12 of the first input feature set by the first weight signal W21 of the second weight data. The second processing element PE2 may receive a second weight signal W12 of the first weight data and receive the first feature F11 of the first input feature set from the first processing element PE1, in synchronization with the second clock signal CLK2. The second processing element PE2 may generate F11W12 by multiplying the first feature F11 of the first input feature set by the second weight signal W12 of the first weight data. The third processing element PE3 may receive a first feature F21 of the second input feature set and receive the first weight signal W11 of the first weight data from the first processing element PE1, in synchronization with the second clock signal CLK2. The third processing element PE3 may generate F21W11 by multiplying the first feature F21 of the second input feature set by the first weight signal W11 of the first weight data.

When the third clock signal CLK3 toggles during a third unit cycle, the first processing element PE1 may accumulate previously computed F11W11 and F12W21, and store the computation result F11W11+F12W21. The first processing element PE1 may receive a third feature F13 of the first input feature set and a first weight signal W31 of the third weight data. The first processing element PE1 may output the second feature F12 of the first input feature set to the second processing element PE2, and output the first weight signal W21 of the second weight data to the third processing element PE3. The first processing element PE1 may generate F13W31 by multiplying the third feature F13 of the first input feature set by the first weight signal W31 of the third weight data. The second processing element PE2 may accumulate previously computed F11W12 and 0, and store the computation result. The second processing element PE2 may receive a second weight signal W22 of the second weight data and receive the second feature F12 of the first input feature set from the first processing element PE1. The second processing element PE2 may output the first feature F11 of the first input feature set to the fourth processing element PE4, and output the second weight signal W12 of the first weight data to the fifth processing element PE5. The second processing element PE2 may generate F12W22 by multiplying the second feature F12 of the first input feature set by the second weight signal W22 of the second weight data. The third processing element PE3 may accumulate previously computed F21W11 and 0 and store the computation result. The third processing element PE3 may receive a second feature F22 of the second input feature set and receive the first weight signal W21 of the second weight data from the first processing element PE1. The third processing element PE3 may output the first feature F21 of the second input feature set to the fifth processing element PE5, and output the first weight signal W11 of the first weight data to the sixth processing element PE6. The third processing element PE3 may generate F22W21 by multiplying the second feature F22 of the second input feature set by the first weight signal W21 of the second weight data. The fourth processing element PE4 may receive a third weight signal W13 of the first weight data and receive the first feature F11 of the first input feature set from the second processing element PE2, in synchronization with the third clock signal CLK3. The fourth processing element PE4 may generate F11W13 by multiplying the first feature F11 of the first input feature set by the third weight signal W13 of the first weight data. The fifth processing element PE5 may receive the second weight signal W12 of the first weight data from the second processing element PE2, and receive the first feature F21 of the second input feature set from the third processing element PE3. The fifth processing element PE5 may generate F21W12 by multiplying the first feature F21 of the second input feature set by the second weight signal W12 of the first weight data. The sixth processing element PE6 may receive a first feature F31 of the third input feature set and receive the first weight signal W11 of the first weight data from the third processing element PE3, in synchronization with the third clock signal CLK3. The sixth processing element PE6 may generate F31W11 by multiplying the first feature F31 of the third input feature set by the first weight signal W11 of the first weight data.

When the fourth clock signal CLK4 toggles during a fourth unit cycle, the first processing element PE1 may accumulate previously computed F11W11+F12W21 and F13W31, and store the computation result F11W11+F12W21+F13W31. The first processing element PE1 may output the third feature F13 of the first input feature set to the second processing element PE2, and output the first weight signal W31 of the third weight data to the third processing element PE3. The second processing element PE2 may accumulate previously computed F11W12 and F12W22, and store the computation result F11W12+F12W22. The second processing element PE2 may receive a second weight signal W32 of the third weight data and receive the third feature F13 of the first input feature set from the first processing element PE1. The second processing element PE2 may output the second feature F12 of the first input feature set to the fourth processing element PE4, and output the second weight signal W22 of the second weight data to the fifth processing element PE5. The second processing element PE2 may generate F13W32 by multiplying the third feature F13 of the first input feature set by the second weight signal W32 of the third weight data. The third processing element PE3 may accumulate previously computed F21W11 and F22W21, and store the computation result F21W11+F22W21. The third processing element PE3 may receive a third feature F23 of the second input feature set and receive the first weight signal W31 of the third weight data from the first processing element PE1. The third processing element PE3 may output the second feature F22 of the second input feature set to the fifth processing element PE5, and output the first weight signal W21 of the second weight data to the sixth processing element PE6. The third processing element PE3 may generate F23W31 by multiplying the third feature F23 of the second input feature set by the first weight signal W31 of the third weight data. The fourth processing element PE4 may receive a third weight signal W23 of the second weight data and receive the second feature F12 of the first input feature set from the second processing element PE2, in synchronization with the fourth clock signal CLK4. The fourth processing element PE4 may accumulate previously computed F11W13 and 0, and store the computation result. The fourth processing element PE4 may output the third weight signal W13 of the first weight data to the seventh processing element PE7. The fourth processing element PE4 may generate F12W23 by multiplying the second feature F12 of the first input feature set by the third weight signal W23 of the second weight data. The fifth processing element PE5 may accumulate previously computed F21W12 and 0, and store the computation result. The fifth processing element PE5 may receive the second weight signal W22 of the second weight data from the second processing element PE2, and receive the second feature F22 of the second input feature set from the third processing element PE3. The fifth processing element PE5 may output the first feature F21 of the second input feature set to the seventh processing element PE7, and output the second weight signal W12 of the first weight data to the eighth processing element PE8. The fifth processing element PE5 may generate F22W22 by multiplying the second feature F22 of the second input feature set by the second weight signal W22 of the second weight data. The sixth processing element PE6 may accumulate previously computed F31W11 and 0, and store the computation result. The sixth processing element PE6 may receive a second feature F32 of the third input feature set and receive the first weight signal W21 of the second weight data from the third processing element PE3. The sixth processing element PE6 may output the first feature F31 of the third input feature set to the eighth processing element PE8. The sixth processing element PE6 may generate F32W21 by multiplying the second feature F32 of the third input feature set by the first weight signal W21 of the second weight data. The seventh processing element PE7 may receive the third weight signal W13 of the first weight data from the fourth processing element PE4, and receive the first feature F21 of the second input feature set from the fifth processing element PE5. The seventh processing element PE7 may generate F21W13 by multiplying the first feature F21 of the second input feature set by the third weight signal W13 of the first weight data. The eighth processing element PE8 may receive the second weight signal W12 of the first weight data from the fifth processing element PE5, and receive the first feature F31 of the third input feature set from the sixth processing element PE6. The eighth processing element PE8 may generate F31W12 by multiplying the first feature F31 of the third input feature set by the second weight signal W12 of the first weight data.

When the fifth clock signal CLK5 toggles during a fifth unit cycle, the second processing element PE2 may accumulate previously computed F11W12+F12W22 and F13W32, and store the computation result F11W12+F12W22+F13W32. The second processing element PE2 may output the third feature F13 of the first input feature set to the fourth processing element PE4, and output the second weight signal W32 of the third weight data to the fifth processing element PE5. The third processing element PE3 may accumulate previously computed F21W11+F22W21 and F23W31, and store the computation result F21W11+F22W21+F23W31. The third processing element PE3 may output the third feature F23 of the second input feature set to the fifth processing element PE5, and output the first weight signal W31 of the third weight data to the sixth processing element PE6. The fourth processing element PE4 may accumulate previously computed F11W13 and F12W23, and store the computation result F11W13+F12W23. The fourth processing element PE4 may receive a third weight signal W33 of the third weight data and receive the third feature F13 of the first input feature set from the second processing element PE2. The fourth processing element PE4 may output the third weight signal W23 of the second weight data to the seventh processing element PE7. The fourth processing element PE4 may generate F13W33 by multiplying the third feature F13 of the first input feature set by the third weight signal W33 of the third weight data. The fifth processing element PE5 may accumulate previously computed F21W12 and F22W22, and store the computation result F21W12+F22W22. The fifth processing element PE5 may receive the second weight signal W32 of the third weight data from the second processing element PE2, and receive the third feature F23 of the second input feature set from the third processing element PE3. The fifth processing element PE5 may output the second feature F22 of the second input feature set to the seventh processing element PE7, and output the second weight signal W22 of the second weight data to the eighth processing element PE8. The fifth processing element PE5 may generate F23W32 by multiplying the third feature F23 of the second input feature set by the second weight signal W32 of the third weight data. The sixth processing element PE6 may accumulate previously computed F31W11 and F32W21, and store the computation result F31W11+F32W21. The sixth processing element PE6 may receive a third feature F33 of the third input feature set and receive the first weight signal W31 of the third weight data from the third processing element PE3. The sixth processing element PE6 may output the second feature F32 of the third input feature set to the eighth processing element PE8. The sixth processing element PE6 may generate F33W31 by multiplying the third feature F33 of the third input feature set by the first weight signal W31 of the third weight data. The seventh processing element PE7 may accumulate previously computed F21W13 and 0, and store the computation result. The seventh processing element PE7 may receive the third weight signal W23 of the second weight data from the fourth processing element PE4, and receive the second feature F22 of the second input feature set from the fifth processing element PE5. The seventh processing element PE7 may output the third weight signal W13 of the first weight data to the ninth processing element PE9. The seventh processing element PE7 may generate F22W23 by multiplying the second feature F22 of the second input feature set by the third weight signal W23 of the second weight data. The eighth processing element PE8 may accumulate previously computed F31W12 and 0, and store the computation result. The eighth processing element PE8 may receive the second weight signal W22 of the second weight data from the fifth processing element PE5, and receive the second feature F32 of the third input feature set from the sixth processing element PE6. The eighth processing element PE8 may output the first feature F31 of the third input feature set to the ninth processing element PE9. The eighth processing element PE8 may generate F32W22 by multiplying the second feature F32 of the third input feature set by the second weight signal W22 of the second weight data. The ninth processing element PE9 may receive the third weight signal W13 of the first weight data from the seventh processing element PE7, and receive the first feature F31 of the third input feature set from the eighth processing element PE8. The ninth processing element PE9 may generate F31W13 by multiplying the first feature F31 of the third input feature set by the third weight signal W13 of the first weight data.

When the sixth clock signal CLK6 toggles during a sixth unit cycle, the fourth processing element PE4 may accumulate previously computed F11W13+F12W23 and F13W33, and store the computation result F11W13+F12W23+F13W33. The fourth processing element PE4 may output the third weight signal W33 of the third weight data to the seventh processing element PE7. The fifth processing element PE5 may accumulate previously computed F21W12+F22W22 and F23W32, and store the computation result F21W12+F22W22+F23W32. The fifth processing element PE5 may output the third feature F23 of the second input feature set to the seventh processing element PE7, and output the second weight signal W32 of the third weight data to the eighth processing element PE8. The sixth processing element PE6 may accumulate previously computed F31W11+F32W21 and F33W31, and store the computation result F31W11+F32W21+F33W31. The sixth processing element PE6 may output the third feature F33 of the third input feature set to the eighth processing element PE8. The seventh processing element PE7 may accumulate previously computed F21W13 and F22W23, and store the computation result F21W13+F22W23. The seventh processing element PE7 may receive the third weight signal W33 of the third weight data from the fourth processing element PE4, and receive the third feature F23 of the second input feature set from the fifth processing element PE5. The seventh processing element PE7 may output the third weight signal W23 of the second weight data to the ninth processing element PE9. The seventh processing element PE7 may generate F23W33 by multiplying the third feature F23 of the second input feature set by the third weight signal W33 of the third weight data. The eighth processing element PE8 may accumulate previously computed F31W12 and F32W22, and store the computation result F31W12+F32W22. The eighth processing element PE8 may receive the second weight signal W32 of the third weight data from the fifth processing element PE5, and receive the third feature F33 of the third input feature set from the sixth processing element PE6. The eighth processing element PE8 may output the second feature F32 of the third input feature set to the ninth processing element PE9. The eighth processing element PE8 may generate F33W32 by multiplying the third feature F33 of the third input feature set by the second weight signal W32 of the third weight data. The ninth processing element PE9 may accumulate previously computed F31W13 and 0, and store the computation result. The ninth processing element PE9 may receive the third weight signal W23 of the second weight data from the seventh processing element PE7, and receive the second feature F32 of the third input feature set from the eighth processing element PE8. The ninth processing element PE9 may generate F32W23 by multiplying the second feature F32 of the third input feature set by the third weight signal W23 of the second weight data.

When the seventh clock signal toggles during a seventh unit cycle, the seventh processing element PE7 may accumulate previously computed F21W13+F22W23 and F23W33, and store the computation result F21W13+F22W23+F23W33. The seventh processing element PE7 may output the third weight signal W33 of the third weight data to the ninth processing element PE9. The eighth processing element PE8 may accumulate previously computed F31W12+F32W22 and F33W32, and store the computation result F31W12+F32W22+F33W32. The eighth processing element PE8 may output the third feature F33 of the third input feature set to the ninth processing element PE9. The ninth processing element PE9 may accumulate previously computed F31W13 and F32W23, and store the computation result F31W13+F32W23. The ninth processing element PE9 may generate F33W33 by multiplying the third feature F33 of the third input feature set by the third weight signal W33 of the third weight data.

When the eighth clock signal toggles during an eighth unit cycle, the ninth processing element PE9 may accumulate previously computed F31W13+F32W23 and F33W33, and store the computation result F31W13+F32W23+F33W33. When the ninth clock signal toggles during a ninth unit cycle, the computation results stored in the first to ninth processing elements PE1 to PE9, respectively, may be outputted. As illustrated in FIG. 2B, the convolution operation results (FD×WD) of the first to third input feature sets FD and the first to third weight data WD may be outputted from the first to ninth processing elements PE1 to PE9.

Figure 3:
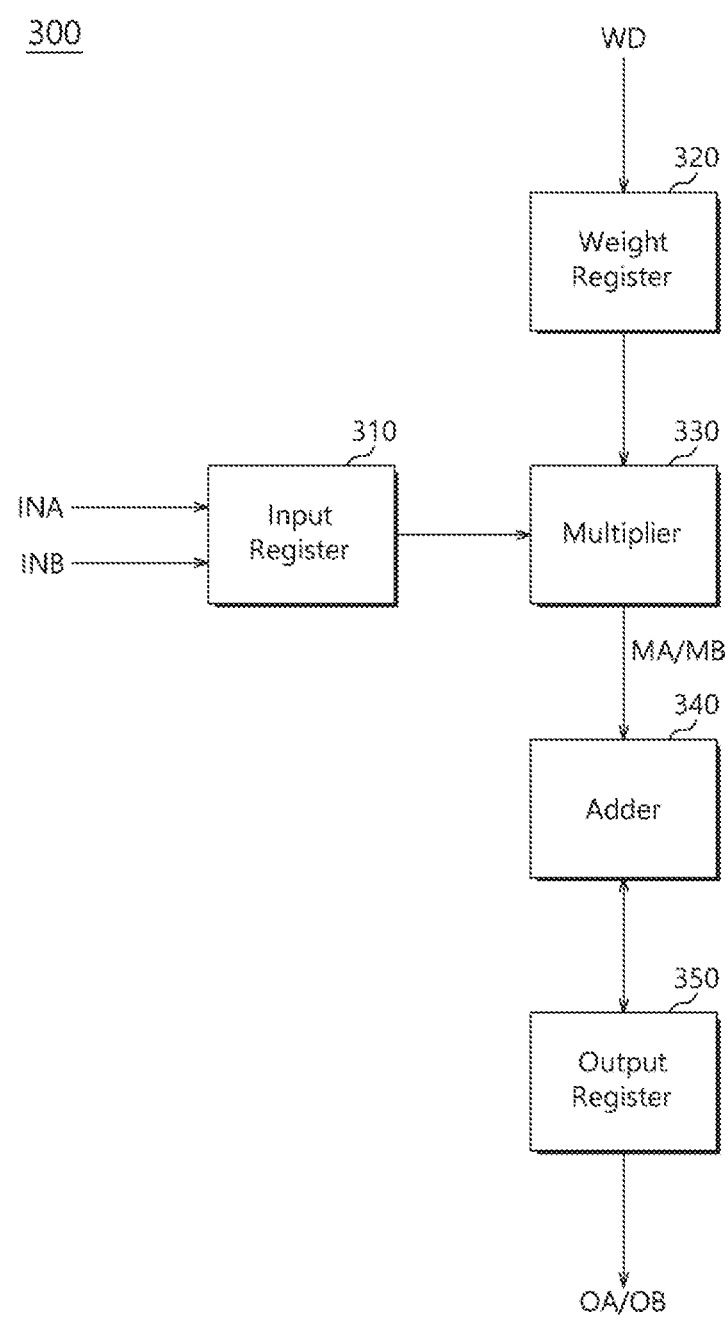
FIG. 3 is a block diagram illustrating a configuration of a processing element in accordance with an embodiment.

FIG. 3 is a block diagram illustrating a configuration of a processing element 300 in accordance with an embodiment. In FIG. 3, the processing element 300 may perform a MAC operation. The processing element 300 may be configured to receive two or more input signals. The processing element 300 may receive at least one of the two or more input signals and a weight signal W in each unit cycle. The processing element 300 may be applied as any of the processing elements PE1 to PE9 illustrated in FIG. 2A. In an embodiment, the two or more input signals may include a first input signal INA and a second input signal INB. The first and second input signals INA and INB may each correspond to one feature of an input feature set. The first and second input signals INA and INB may have a random number of bits. For example, each of the first and second input signals INA and INB may have 8 bits, 16 bits or 32 bits, but the present invention is not limited thereto. The weight signal W may have a random number of bits. For example, the weight signal W may have 4 bits, 8 bits or 16 bits, but the present invention is not limited thereto. The processing element 300 may receive an input signal having any of a plurality of precisions. For example, the first input signal INA may have a first or a second precision. The first precision may be high precision, and the second precision may be low precision. The second input signal INB may have the second precision. The first input signal INA having the first precision may have a set number of bits (a first bit number). Each of the first and second input signals INA and INB having the second precision may have a set number of bits (a second bit number). The first bit number may be greater than the second bit number. In an embodiment, the number of the input signals may be greater than or equal to three. The first bit number may be greater than or equal to $(2X-1)*N$. Here, X may represent the number of input signals, and N may represent the second bit number. When the number of the input signals is two, the first bit number may be three times greater than the second bit number.

The processing element 300 may receive the first input signal INA having the first precision and the weight signal W and perform a MAC operation on the first input signal INA and the weight signal W, during a first computation operation. During the first computation operation, the second input signal INB may not be inputted to the processing element 300. The processing element 300 may receive the first input signal INA having the second precision, and receive the second input signal INB having the second precision with the first input signal INA, during a second computation operation. The processing element 300 may perform a MAC operation on the first input signal INA and the weight signal W, and perform a MAC operation on the second input signal INB and the weight signal W. The processing element 300 may receive the first and second input signals INA and INB having the second precision at the same time, and perform a computation on the first and second input signals INA and INB at the same time, thereby increasing the computation efficiency and performance of the computation circuit including the processing element 300.

The processing element 300 may include an input register 310, a weight register 320, a multiplier 330, an adder 340 and an output register 350. The input register 310 may receive the first input signal INA and the second input signal INB, and store the first and second input signals INA and INB. The input register 310 may include a storage space with a capacity to store at least the maximum value of the first bit number. When receiving the first and second input signals INA and INB at the same time, the input register 310 may store the first and second input signals INA and INB at positions remote from each other in the storage space. For example, the input register 310 may store the second input signal INB in bits whose turns sequentially increase from the least significant bit of the storage space. When the number of bits in the second input signal INB is N (where N is a random integer), the input register 310 may store the second input signal INB in first to Nth bits of the storage space, and store the first input signal INA in 2Nth to 3Nth bits of the storage space. The weight register 320 may receive the weight signal W, and store the weight signal W. The weight register 320 may include a storage space capable of receiving the weight signal W.

The multiplier 330 may receive one or more of the first and second input signals INA and INB from the input register 310, and receive the weight signal W from the weight register 320. The multiplier 330 may multiply one or more of the first and second input signals INA and INB by the weight signal W. When receiving only the first input signal INA from the input register 310, the multiplier 330 may multiply the first input signal INA by the weight signal W, and output a multiplication value MA for the first input signal INA. When receiving both of the first and second input signals INA and INB from the input register 310, the multiplier 330 may multiply each of the first and second input signals INA and INB by the weight signal W, and thus generate both a multiplication value MA for the first input signal INA and a multiplication value MB for the second input signal INB.

The adder 340 may receive the multiplication values MA and/or MB from the multiplier 330. The output register 350 may store computation values OA and OB of the processing element 300, and output the stored computation values OA and OB. The output register 350 may include a storage space with a capacity to store the computation values OA and OB for the first and second input signals INA and INB. The output register 350 may separately store the computation value OA for the first input signal INA and the computation value OB for the second input signal INB. The adder 340 may update the computation values OA and OB for the first and second input signals INA and INB by adding multiplication values MA and MB for new first and second input signals INA and INB to the computation values of the first and second input signals INA and INB, respectively, which have been stored in the output register 350. For example, the adder 340 may update the computation value OA for the first input signal INA by adding a computation value MA for a current first input signal INA to the previous computation value OA for the first input signal INA. For another example, the adder 340 may update the computation value OB for the second input signal INB by adding a multiplication value MB for a current second input signal INB to the previous computation value OB for the second input signal INB.

Figure 4:
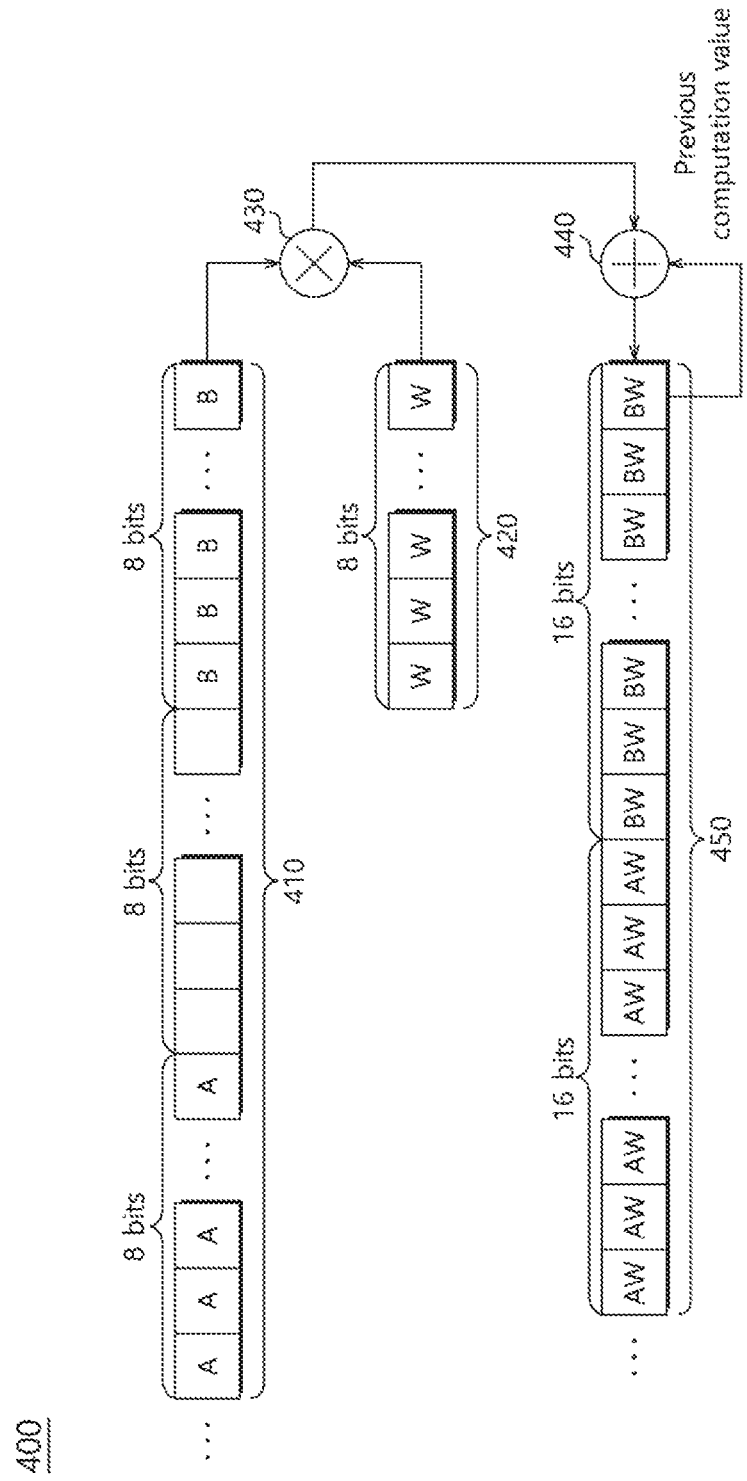
FIG. 4 is a diagram illustrating a configuration and operation of the processing element illustrated in FIG. 3.

FIG. 4 is a diagram illustrating a configuration and operation of a processing element 400 illustrated in FIG. 3. Referring to FIG. 4, the processing element 400 may include an input register 410, a weight register 420, a multiplier 430, an adder 440 and an output register 450. By way of example, FIG. 4 illustrates that the weight signal W includes eight bits, and each of two input signals having the second precision includes eight bits. Referring to FIG. 3 as well as FIG. 4, the input register 410 may have a storage space with the capacity to store the first and second input signals INA and INB. The input register 410 may receive the first input signal INA having the first precision or receive the first and second input signals INA and INB having the second precision. The first input signal INA having the first precision may include 16 bits or 32 bits. Each of the first and second input signals INA and INB having the second precision may include eight bits. The input register 410 may have a storage space with a capacity for at least 24 bits to store the first and second input signals INA and INB each including eight bits, such that a multiplication value for the second input signal INB does not have an influence on a multiplication value for the first input signal INA. When receiving the first input signal INA having the first precision, the input register 410 may sequentially store the first to 16th bits of the first input signal INA in first to 16th bits of the storage space, respectively. When receiving the first input signal INA and the second input signal INB, the input register 410 may store the first to eighth bits A of the first input signal INA in 17th to 24th bits of the storage space, and store the first to eighth bits B of the second input signal INB in the first to eighth bits of the storage space. In this case, the ninth to 16th bits of the storage space may have no information stored therein. For example, a value of 0 may be stored in the ninth to 16th bits of the storage space. The weight register 420 may store the weight signal W in a storage space. The weight register 420 may have the storage space with a capacity to store eight bits, and store the first to eighth bits of the weight signal W in first to eighth bits of the storage space. Although not illustrated, the input register 410 may include an additional storage space including 25th to 32nd bits. When receiving the first input signal INA including 32 bits, the input register 410 may store the 25th to 32nd bits of the first input signal INA in the additional storage space.

The multiplier 430 may multiply each of the first and second input signals INA and INB stored in the input register 410 by the weight signal W stored in the weight register 420. The multiplication value generated by the multiplier 430 may be stored in the output register 450 through the adder 440. The adder 440 may add the multiplication value from the multiplier 430 to a computation value stored in the output register 450. The output register 450 may include a storage space with a capacity to store at least 32 bits. Although not illustrated, the output register 450 may include an additional storage space to store a computation value for the first input signal including 32 bits. The output register 450 may store a computation value BW for the second input signal INB in the first to 16th bits of the storage space, and store a computation value AW for the first input signal INA in the 17th to 32nd bits of the storage space. However, the following concern may occur: the output register 450 cannot help but store only one computation result in the worse case where the first and second input signals INA and INB and the weight signal W have the maximum value. That is because, when a multiplication value for a new input signal is added to the previous computation value stored in the output register 450, the computation value BW for the second input signal INB may change the value of the 17th bit of the storage space for storing the computation value AW for the first input signal INA. Therefore, a computation circuit including the processing element 400 illustrated in FIG. 4 may be configured as illustrated in FIG. 5.

Figure 5:
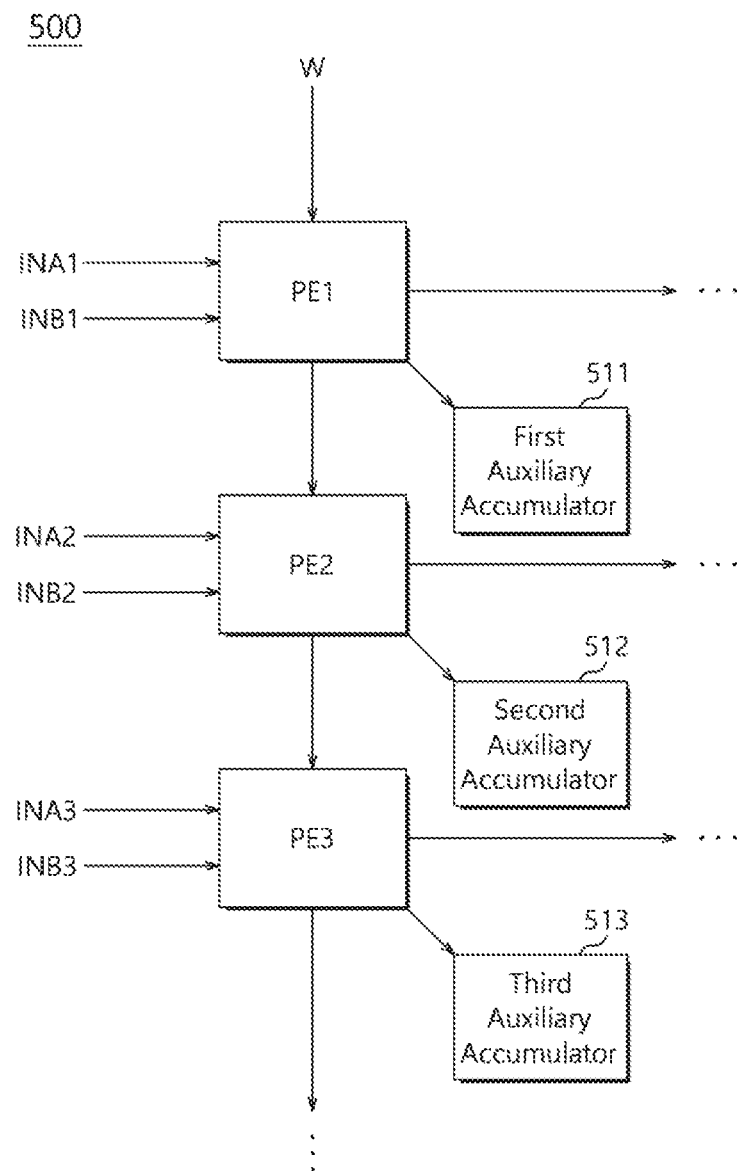
FIG. 5 is a diagram illustrating a configuration of a computation circuit in accordance with an embodiment.

FIG. 5 is a diagram illustrating a configuration of a computation circuit 500 in accordance with an embodiment. Referring to FIG. 5, the computation circuit 500 may include a plurality of processing elements and a plurality of auxiliary accumulators. The computation circuit 500 may be a systolic array in which a plurality of processing elements are arranged in a matrix shape to perform a MAC operation. By way of example, FIG. 5 illustrates a plurality of processing elements arranged in the column direction. The plurality of processing elements may include first to third processing elements PE1 to PE3. The first processing element PE1 may perform a MAC operation on one or more of the first input signal INA1 and the second input signal INB1 which are received in each unit cycle. The second processing element PE2 may perform a MAC operation on one or more of a third input signal INA2 and a fourth input signal INB2 which are received in each unit cycle. The third processing element PE3 may perform a MAC operation on one or more of a fifth input signal INA3 and a sixth input signal INB3 which are received in each unit cycle.

When the first to third processing elements PE1 to PE3 may have the same configuration as the processing element 400 illustrated in FIG. 4, each of the first to third processing elements PE1 to PE3 may require an auxiliary accumulator to perform a MAC operation on two input signals at the same time. The first auxiliary accumulator 511 may be coupled to the first processing element PE1, store a computation value outputted from the first processing element PE1, and update the stored computation value in each unit cycle. Referring to FIG. 3 as well as FIG. 5, the first processing element PE1 may multiply each of the first and second input signals INA1 and INB1 by the weight signal W, and store the multiplication values in the output register 350. Instead of the first processing element PE1, the first auxiliary accumulator 511 may perform the addition for the first processing element PE1. That is, the first processing element PE1 may output the computation value stored in the output register 350 to the first auxiliary accumulator 511, and store the multiplication values of the received first and second input signals INA1 and INB1 by the weight signal W in the output register 350, in each unit cycle. The first auxiliary accumulator 511 may accumulate the computation values outputted from the first processing element PE1 and store the accumulated value, in each unit cycle. The second auxiliary accumulator 512 may be coupled to the second processing element PE2, store a computation value outputted from the second processing element PE2, and update the stored computation value in each unit cycle. The third auxiliary accumulator 513 may be coupled to the third processing element PE3, store a computation value outputted from the third processing element PE3, and update the stored computation value in each unit cycle. As such, when the computation circuit 500 includes the auxiliary accumulator coupled to each of the processing elements in order to perform a MAC operation on two input signals at the same time, it may indicate that two computation logics are used to perform a MAC operation on two input signals at the same time. Thus, the efficiency and gain of the computation operation may be reduced.

Figure 6:
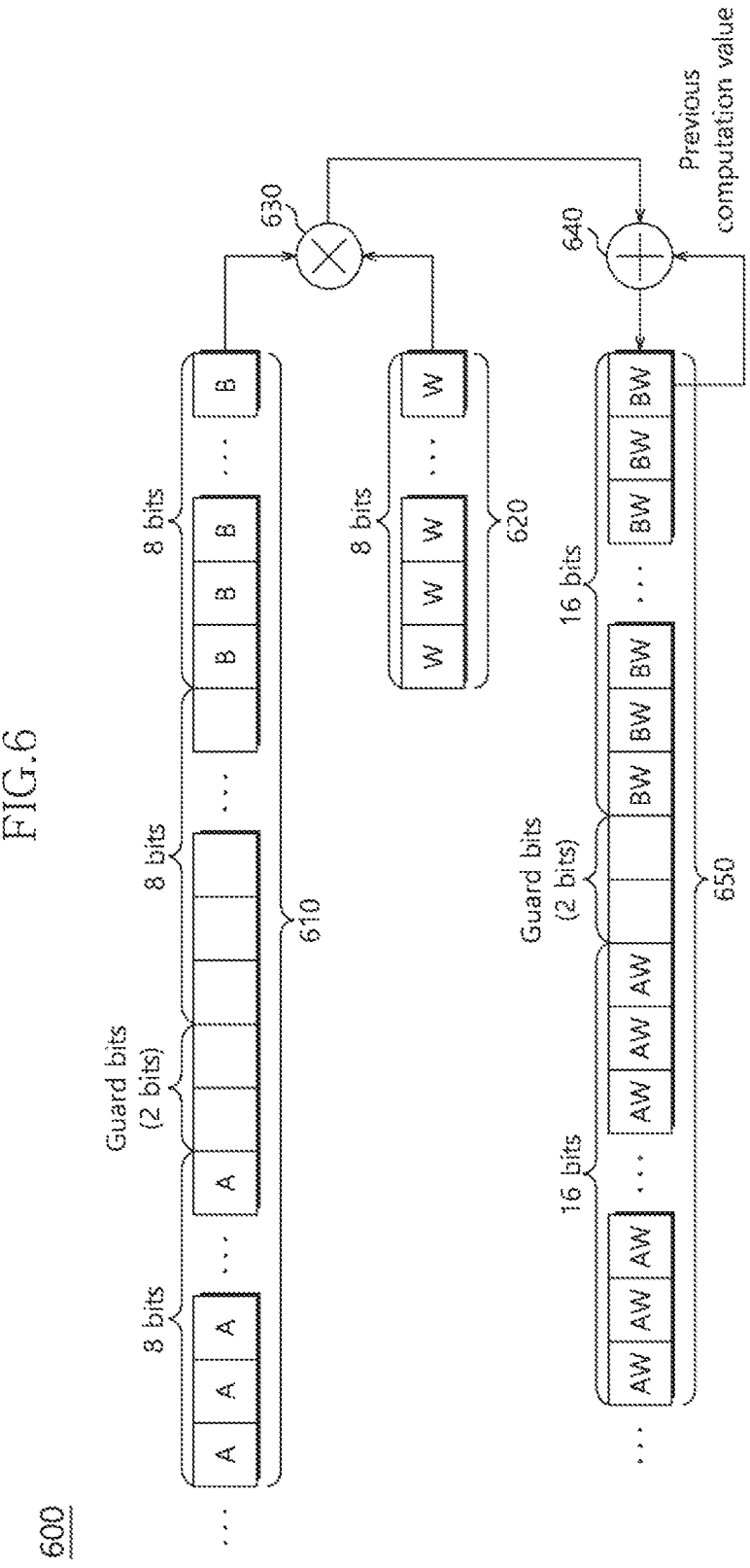
FIG. 6 is a diagram illustrating a configuration and operation of a processing element in accordance with an embodiment.

FIG. 6 is a diagram illustrating a configuration and operation of a processing element 600 in accordance with an embodiment. Referring to FIG. 6, the processing element 600 may include an input register 610, a weight register 620, a multiplier 630, an adder 640 and an output register 650. Compared to FIG. 4, the input register 610 may include a larger storage space than the input register 410. For example, the input register 610 may include a storage space with a capacity to store at least 26 bits. The input register 610 may store the first to eighth bits B of the second input signal INB (not illustrated) in first to eighth bits of the storage space, and store the first to eighth bits of the first input signal INA in 19th to 26 bits of the storage space. In this case, ninth to 18th bits of the storage space may have no information stored therein, and a value of 0 may be stored in the ninth to 18th bits of the storage space. The ninth to 16th bits of the storage space may be a minimum number of bits for preventing the computation values for the first and second input signals INA and INB from having an influence on each other, and the 17th and 18th bits may be guard bits. Therefore, when each of the first and second input signals includes N bits and the number of guard bits is G, the input register 610 may store the second input signal in the first to Nth bits of the storage space, and store the first input signal in the Nth to (2N+G)th bit of the storage space. Here, N and G may be random integers. Although not illustrated, the input register 610 may further include an additional storage space to store the first input signal INA including 32 bits.

The weight register 620 may store the weight signal W. The multiplier 630 may multiply each of the first and second input signals INA and INB stored in the input register 610 by the weight signal W stored in the weight register 620. The adder 640 may update the computation value stored in the output register 650 by adding the multiplication value from the multiplier 630 to the previous computation value stored in the output register 650. The output register 650 may include a larger storage space than the output register 450. For example, the output register 650 may include a storage space with a capacity to store at least 34 bits. The output register 650 may store the computation value BW for the second input signal INB in the first to 18th bits of the storage space. The output register 650 may store the computation value AW for the first input signal INA in the 19th to 34th bits of the storage space. Although not illustrated, the output register 650 may further include an additional storage space to store the computation value AW for the first input signal INA. Therefore, the output register 650 may store the computation value BW for the second input signal INB in the first to (M+G)th bits of the storage space, and store the computation value AW for the first input signal INA in the (M+G+1)th to (2M+2G)th bits of the storage space. Here, M may represent the sum of the bit number of the first or second input signal INA or INB and the bit number of the weight signal W. The output register 650 may include guard bits between the bits in which the computation value AW for the first input signal INA is stored and the minimum number of bits in which the computation value BW for the second input signal INB is stored. By way of example, FIG. 6 illustrates that the number of guard bits is two, but more generally, the number of the guard bits may be defined as the following equation.

$$K \cdot 2^{2(N-1)} \leq 2^{2N \rightarrow G-1} - 1$$

Here, N may represent the number of bits in each of the first and second input signals INA and INB, and G may represent the number of guard bits. Furthermore, K may represent the number of times that one processing element can perform additions, that is, the number of times that one processing element can update the computation value, when the values of the first and second input signals INA and INB and the number of the guard bits G are defined. In other words, K may represent a threshold value at which no overflow occurs. The values of the first and second input signals INA and INB may be integers ranging from $-2^{N-1}$ to $2N^{-1}-1$. For example, when N is eight and G is two, the first and second input signals INA and INB may be integers ranging from –128 to 127, and the maximum value of K may be seven. Therefore, although one processing element performs seven additions, the computation value BW for the second input signal INB may have no influence on the computation value AW for the first input signal INA. That is, although one processing element performs seven additions, no overflow may occur, and the computation value BW for the second input signal INB may be stored in the storage space of the output register 650 from the least significant bit to the guard bit. The number of the guard bits may be randomly set, and K may be increased as the number of the guard bits is increased. However, when the number of the guard bits is excessively high, the storage space of the input register 610 and/or the output register 650 may be increased. In this case, the circuit area of one processing element may be increased. Therefore, the number of the guard bits may be properly set to such a level that can optimize the efficiency and area of the computation circuit, which have a trade-off relationship.

When the minimum value is not included in the range of the first and second input signals INA and INB, K may be increased.

$$K \cdot (2^{2(N-1)} - 2^N + 1) \leq 2^{2N \rightarrow G-1} - 1$$

The values of the first and second input signals INA and INB may be integers ranging from $-2^{N-1}+1$ to $2^{N-1}-1$. The first and second input signals INA and INB may be integers ranging from –127 to 127, and the maximum value of K may be eight. Therefore, although one processing element performs eight additions, the computation value BW for the second input signal INB may have no influence on the computation value AW for the first input signal INA. That is, although one processing element performs eight additions, no overflow may occur, and the computation value BW for the second input signal INB may be stored in the storage space of the output register 650 from the least significant bit to the guard bit.

Figure 7:
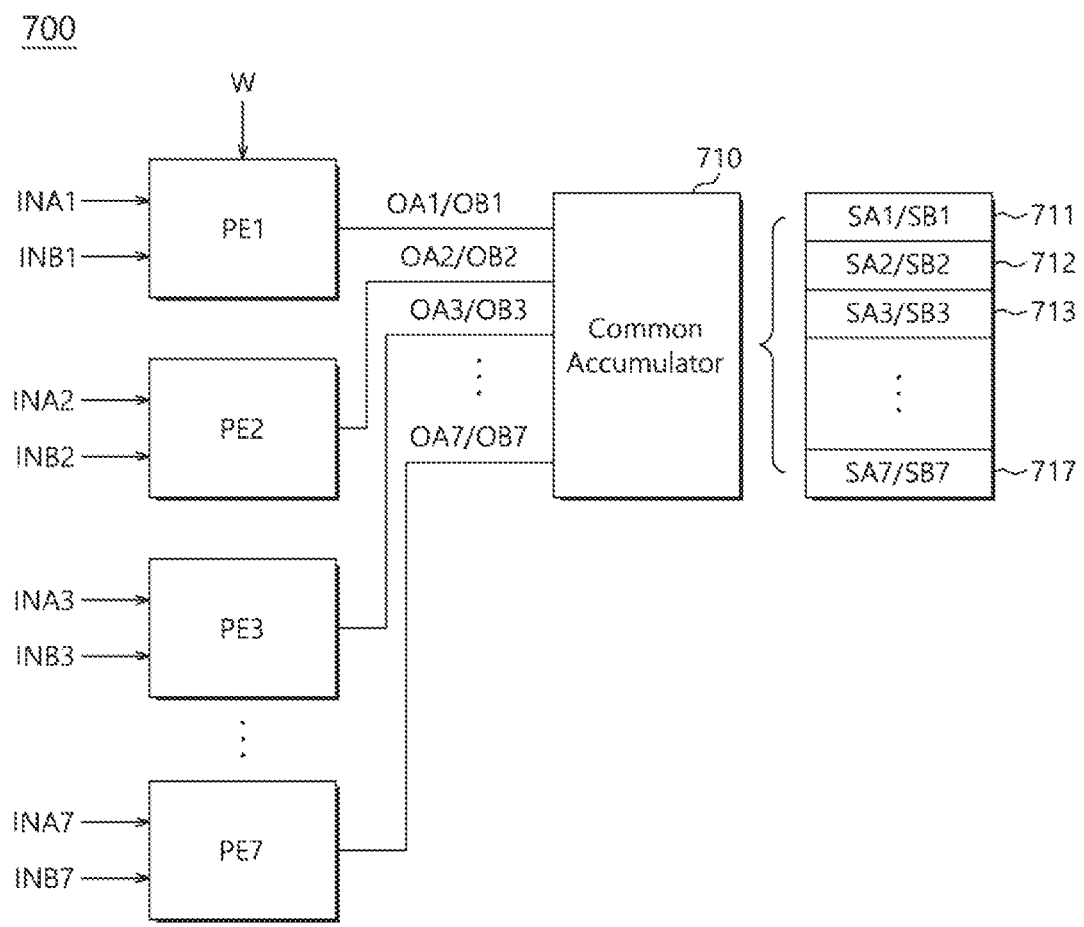
FIG. 7 is a diagram illustrating a configuration of a computation circuit in accordance with an embodiment.

FIG. 7 is a diagram illustrating a configuration of a computation circuit 700 in accordance with an embodiment. Referring to FIG. 7, the computation circuit 700 may include a plurality of processing elements and a common accumulator 710. The computation circuit 700 may be a systolic array in which a plurality of processing elements are arranged in a matrix shape to perform a MAC operation. By way of example, FIG. 7 illustrates a plurality of processing elements arranged in the column direction. The plurality of processing elements may be sequentially coupled in series. The common accumulator 710 may be coupled to K processing elements among the plurality of processing elements. The common accumulator 710 may be sequentially and cyclically coupled to the K processing elements in each unit cycle. The common accumulator 710 may coupled to the K processing elements in each unit cycle immediately before the K processing elements overflow. The common accumulator 710 may be coupled to each of the K processing elements based on whether the number of additions in the corresponding K processing element has reached the threshold value. For example, the common accumulator 710 may be sequentially and cyclically coupled to the K processing elements from a (K+1)th unit cycle. The case in which K is seven is described below. The computation circuit 700 may be eight or more processing elements, and FIG. 7 illustrates seven of those processing elements.

The first to seventh processing elements PE1 to PE7 may be sequentially coupled in series. The first processing element PE1 may receive one or more of the first and second input signals INA1 and INB1 and the weight signal W and multiply one or more of the first and second input signals INA1 and INB1 by the weight signal W, in each unit cycle from a first unit cycle. The first processing element PE1 may multiply the first input signal INA1 by the weight signal W, and multiply the second input signal INB1 by the weight signal W. The first processing element PE1 may update computation values OA1 and OB1 for the first and second input signals INA1 and INB1 by adding the multiplication values for the first and second input signals INA1 and INB1 to the previous computation values in each unit cycle from a second unit cycle. The second processing element PE2 may receive one or more of the third and fourth input signals INA2 and INB2 and the weight signal W from the first processing element PE1 and multiply one or more of the third and fourth input signals INA2 and INB2 by the weight signal W, in each unit cycle from the second unit cycle. The second processing element PE2 may multiply the third input signal INA2 by the weight signal W, and multiply the fourth input signal INB2 by the weight signal W. The second processing element PE2 may update computation values OA2 and OB2 for the third and fourth input signals INA2 and INB2 by adding the multiplication values for the third and fourth input signals INA2 and INB2 to the previous computation values in each unit cycle from a third unit cycle. The third processing element PE3 may receive one or more of the fifth and sixth input signals INA3 and INB3 and the weight signal W from the second processing element PE2, and multiply one or more of the fifth and sixth input signals INA3 and INB3 by the weight signal W, in each unit cycle from the third unit cycle. The third processing element PE3 may multiply the fifth input signal INA3 by the weight signal W, and multiply the sixth input signal INB3 by the weight signal W. The third processing element PE3 may update computation values OA3 and OB3 for the fifth and sixth input signals INA3 and INB3 by adding the multiplication values for the fifth and sixth input signals INA3 and INB3 to the previous computation values in each unit cycle from a fourth unit cycle. The seventh processing element PE7 may receive one or more of 13th and 14th input signals INA7 and INB7 and the weight signal W from the sixth processing element (not illustrated) and multiply one or more of the 13th and 14th input signals INA7 and INB7 by the weight signal W, in each unit cycle from a seventh unit cycle. The seventh processing element PE7 may multiply the 13th input signal INA7 by the weight signal W, and multiply the 14th input signal INB7 by the weight signal W. The seventh processing element PE7 may update computation values OA7 and OB7 for the 13th and 14th input signals INA7 and INB7 by adding the multiplication values for the 13th and 14th input signals INA7 and INB7 to the previous computation values in each unit cycle from an eighth unit cycle.

The common accumulator 710 may be sequentially and cyclically coupled to the first to seventh processing elements PE1 to PE7. The common accumulator 710 may be coupled to the first to seventh processing elements PE1 to PE7 in each unit cycle immediately before the first to seventh processing elements PE1 to PE7 overflow. The common accumulator 710 may be coupled to each of the first to seventh processing elements PE1 to PE7 in each unit cycle in which the number of additions in the corresponding processing element reaches the threshold value. For example, the common accumulator 710 may be coupled to the first processing element PE1 during the eighth unit cycle immediately before the first processing element PE1 overflows because the first processing element PE1 has performed seven additions. Further, the common accumulator 710 may be coupled to the second processing element PE2 during a ninth unit cycle immediately before the second processing element PE2 overflows because the second processing element PE2 has performed seven additions. Furthermore, the common accumulator 710 may be sequentially coupled to the third to seventh processing elements PE3 to PE7 during the tenth to 14th unit cycles immediately before the third to seventh processing elements respectively overflow because the third to seventh processing elements have performed seven additions. The common accumulator 710 may be coupled to the first processing element PE1 again during a 15th unit cycle, and coupled to the second to seventh processing elements PE2 to PE7 again during 16th to 22nd unit cycles, respectively. The common accumulator 710 may store computation values outputted from the plurality of processing elements as computation information. Whenever the common accumulator 710 is coupled to one of the plurality of processing elements, the common accumulator 710 may update the computation information by receiving a new computation value outputted from the coupled processing element and adding a value corresponding to the previously stored computation information to the new computation value.

The common accumulator 710 may include a storage space for storing respective computation information SA1/SB1 to SA7/SB7 related to the first to seventh processing elements PE1 to P7. The common accumulator 710 may include first to seventh storage spaces 711 to 717. The common accumulator 710 may store first computation information SA1/SB1 related to the first processing element PE1 in the first storage space 711. The first computation information SA1 may be computation information related to the first input signal INA1 received from the first processing element PE1. The first computation information SB1 may be computation information related to the second input signal INB1 received from the first processing element PE1. The common accumulator 710 may receive the computation values OA1 and OB1 outputted from the first processing element PE1, and adding the computation values OA1 and OB1 to values corresponding to the computation information SA1/SB1 stored in the first storage space 711, respectively, thereby updating the computation information SA1/SB1. The common accumulator 710 may store second computation information SA2/SB2 related to the second processing element PE2 in the second storage space 712. The second computation information SA2 may be computation information related to the third input signal INA2 received from the second processing element PE2. The second computation information SB2 may be computation information related to the fourth input signal INB2 received from the second processing element PE2. The common accumulator 710 may receive the computation values OA2 and OB2 outputted from the second processing element PE2, and add the computation values OA2 and OB2 to values corresponding to the computation information SA2/SB2 stored in the second storage space 712, respectively, thereby updating the computation information SA2/SB2. The common accumulator 710 may store third computation information SA3/SB3 related to the third processing element PE3 in the third storage space 713. The third computation information SA3 may be computation information related to the fifth input signal INA3 received from the third processing element PE3. The third computation information SB3 may be computation information related to the sixth input signal INB3 received from the third processing element PE3. The common accumulator 710 may receive the computation values OA3 and OB3 outputted from the third processing element PE3, and add the computation values OA3 and OB3 to values corresponding to the computation information SA3/SB3 stored in the third storage space 713, respectively, thereby updating the computation information SA3/SB3. The common accumulator 710 may store seventh computation information SA7/SB7 related to the seventh processing element PE7 in the seventh storage space 717. The seventh computation information SA7 may be computation information related to the 13th input signal INA7 received from the seventh processing element PE7. The seventh computation information SB7 may be computation information related to the 14th input signal INB7 received from the seventh processing element PE7. The common accumulator 710 may receive the computation values OA7 and OB7 outputted from the seventh processing element PE7, and add the computation values OA7 and OB7 to values corresponding to the computation information SA7/SB7 stored in the seventh storage space 717, respectively, thereby updating the computation information SA7/SB7.

Figure 8:
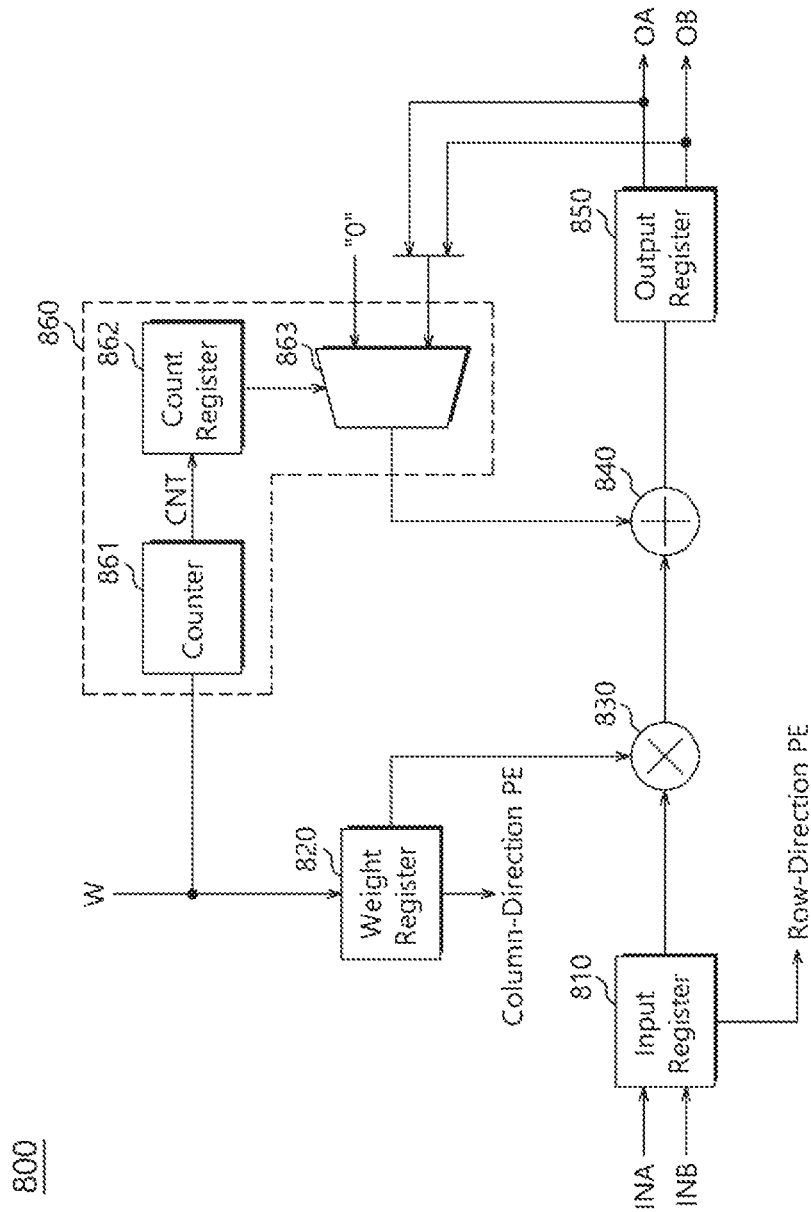
FIG. 8 is a diagram illustrating a configuration of a processing element in accordance with an embodiment.

FIG. 8 is a diagram illustrating a configuration of a processing element 800 in accordance with an embodiment. Referring to FIG. 8, the processing element 800 may be applied as each of the first to seventh processing elements PE1 to PE7 illustrated in FIG. 7. The processing element 800 may include an input register 810, a weight register 820, a multiplier 830, an adder 840, an output register 850 and an overflow controller 860. The input register 810 may receive at least one of the first and second input signals INA and INB in each unit cycle. The input register 610 illustrated in FIG. 6 may be applied as the input register 810. The input register 810 may output the first and second input signals INA and INB stored therein to another processing element coupled to the processing element 800 in the row direction in each unit cycle. The weight register 820 may receive the weight signal W in each unit cycle. The weight register 820 may output the weight signal W stored therein to another processing element coupled to the processing element 800 in the column direction in each unit cycle. The multiplier 830 may multiply each of the first and second input signals INA and INB stored in the input register 810 by the weight signal W stored in the weight register 820. The output register 850 may store the computation values OA and OB of the processing element 800. The output register 650 illustrated in FIG. 6 may be applied as the output register 850. The adder 840 may add an output of the overflow controller 860 and the multiplication values of the multiplier 830, and store the addition values as the computation values OA and OB in the output register 850.

The overflow controller 860 may output one of a value of 0 and the computation values stored in the output register 850 to the adder 840 based on the weight signal W. The overflow controller 860 may sense an overflow of the processing element 800 based on the number of times that the weight signal W is inputted. The overflow controller 860 may count the weight signal W inputted to the processing element 800 in each unit cycle, and sense an overflow of the processing element 800 according to the counting value CNT. The overflow controller 860 may output the computation values OA and OB stored in the output register 850 whenever the counting value CNT becomes a set value. Further, the overflow controller 860 may output a value of 0 when the counting value CNT is not the set value. The set value may be n*K+2. Here, n may be an integer greater than or equal to 1. For example, the overflow controller 860 may output a value of 0 when the counting value CNT is a (K+2)th value, and output the computation values OA and OB stored in the output register 850 in the other cases. The overflow controller 860 may control the output register 850 to store the computation values OA and OB on which additions have been performed by the number of times corresponding to a threshold value. The overflow controller 860 may control the output register 850 to store only new computation values OA and OB outputted from the multiplier 830, when the number of additions exceeds the threshold value.

The overflow controller 860 may include a counter 861, a count register 862 and a selector 863. The counter 861 may count the number of times that the weight signal W is inputted to generate a counting value CNT. The counting value CNT may be stored in the count register 862. The selector 863 may receive the counting value CNT from the count register 862, and receive a value of 0 and the computation values OA and OB stored in the output register 850. The selector 863 may output one of a value of 0 and the computation values OA and OB based on the counting value CNT. The selector 863 may output the computation values OA and OB stored in the output register 850 when the counting value CNT is not the set value. Further, the selector 863 may output a value of 0 when the counting value CNT reaches the set value.

In an embodiment, the overflow controller of the first processing element PE1 illustrated in FIG. 7 may include all of the counter 861, the count register 862 and the selector 863 which are illustrated in FIG. 8. In an embodiment, the overflow controllers of the second to seventh processing elements PE2 to PE7 may include only the selector 863 among the components of the overflow controller 860 illustrated in FIG. 8. The selectors of the second to seventh processing elements PE2 to PE7 may respectively or sequentially receive a counting value from the count register of the first processing element PE1, and respectively output one of a value of 0 and the computation values stored in the output registers according to the counting value.

Figure 9:
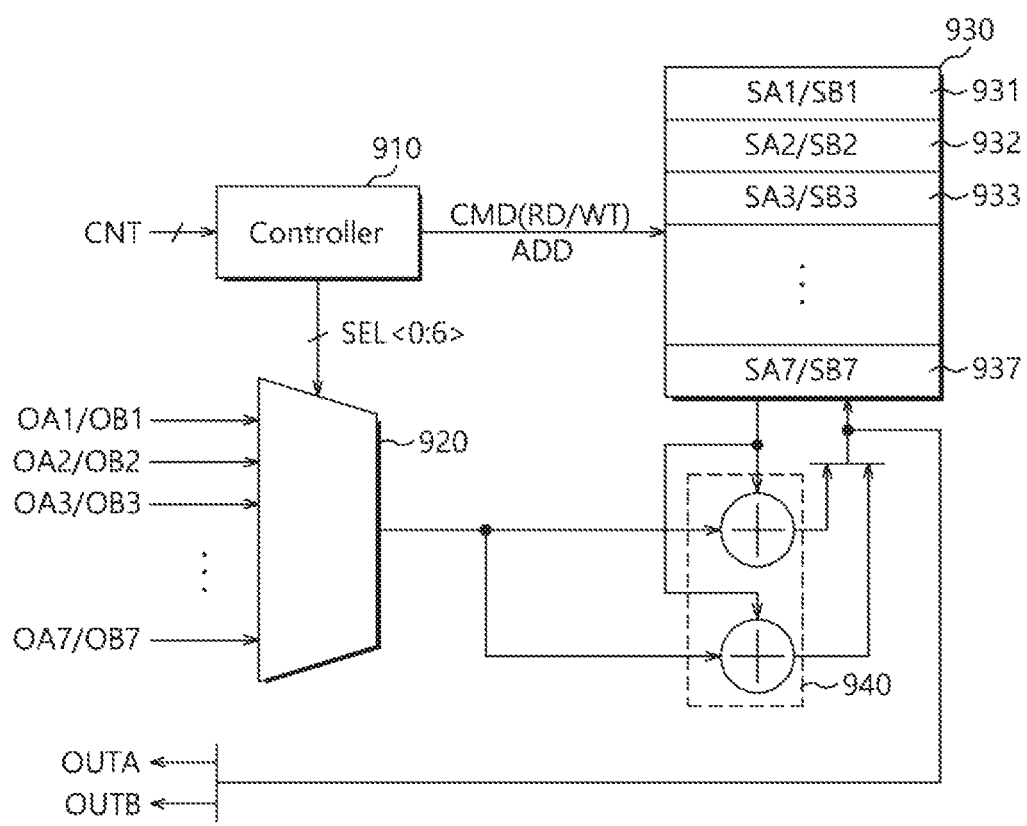
FIG. 9 is a diagram illustrating a common accumulator in accordance with an embodiment.

FIG. 9 is a diagram illustrating a configuration of a common accumulator 900 in accordance with an embodiment. Referring to FIG. 9, the common accumulator 900 may be applied as the common accumulator 710 illustrated in FIG. 7. The common accumulator 900 may include a controller 910, a selector 920, a memory 930 and an adder 940. The controller 910 may generate a selection signal SEL<0:6>, a command signal CMD and an address signal ADD according to whether the number of additions in each of the plurality of processing elements coupled to the common accumulator 900 has reached the threshold value. The selection signal SEL<0:6> may include a plurality of bits, and the number of bits in the selection signal SEL<0:6> may correspond to the number of the processing elements coupled to the common accumulator 900. Referring to FIG. 7 as well as FIG. 9, the case in which the common accumulator 900 is coupled to seven processing elements will be described. The controller 910 may enable a specific bit of the selection signal SEL<0:6> based on whether the number of additions in the corresponding process element among the first to seventh processing elements PE1 to PE7 has reached the threshold value. For example, during the unit cycle in which the number of additions in the first processing element PE1 reaches the threshold value, the controller 910 may enable the first bit SEL<0> of the selection signal. During the unit cycle in which the number of additions in the second processing element PE2 reaches the threshold value, the controller 910 may disable the first bit SEL<0> of the selection signal, and enable the second bit SEL<1> of the selection signal. During the cycles in which the numbers of additions in the third to seventh processing elements PE3 to PE7 sequentially reach the threshold value, the controller 910 may disable the previously enabled bit among the bits of the selection signal SEL<0:6>, and enable the third to seventh bits SEL<2:6>, respectively. During the unit cycle in which the first processing element PE1 overflows again, the controller 910 may disable the seventh bit SEL<6> of the selection signal, and enable the first bit SEL<0> of the selection signal again. The controller 910 may generate a command signal CMD and address signal ADD for accessing the memory 930, based on whether the number of additions in each of the first to seventh processing elements PE1 to PE7 has reached the threshold value. More details will be described below. The controller 910 may receive the counting value CNT stored in the count register 862 of the overflow controller 860 of FIG. 8, which may be installed in each of the first to seventh processing elements PE1 to PE7 or installed in the first processing element PE1. Further, the controller 910 may determine whether the plurality of processing elements coupled to the common accumulator 900 have overflowed.

The selector 920 may be coupled to the first to seventh processing elements PE1 to PE7, and receive the computation values OA1/OB1 to OA7/OB7 outputted from the first to seventh processing elements PE1 to PE7. The selector 920 may receive the selection signal SEL<0:6>, and select one of the computation values OA1/OB1 to OA7/OB7 outputted from the first to seventh processing elements PE1 to PE7 based on the selection signal SEL<0:6>. The selector 920 may receive the computation value OA1/OB1 outputted from the first processing element PE1 when the first bit SEL<0> of the selection signal is enabled. The selector 920 may receive the computation value OA2/OB2 outputted from the second processing element PE2 when the second bit SEL<1> of the selection signal is enabled. The selector 920 may receive the computation values OA3/OB3 to OA7/OB7 outputted from the third to seventh processing elements PE3 to PE7, when the third to seventh bits SEL<2:6> of the selection signal are respectively enabled.

The memory 930 may receive the command signal CMD and the address signal ADD from the controller 910. Further, the memory 930 may store the first to seventh computation information SA1/SB1 to SA7/SB7 based on the command signal CMD and the address signal ADD. The command signal CMD may include a read command signal RD and a write command signal WT. The memory 930 may include first to seventh storage spaces 931 to 937 for respectively storing the first to seventh computation information SA1/SB1 to SA7/SB7. The first to seventh storage spaces 931 to 937 may be accessed based on different address signals. The controller 910 may sequentially generate the read command signal RD and the write command signal WT whenever the first to seventh processing elements PE1 to PE7 overflow, and generate different address signals for accessing the first to seventh storage spaces 931 to 937. The memory 930 may output any one of the first to seventh computation information SA1/SB1 to SA7/SB7 stored in the first to seventh storage spaces 931 to 937, based on the read command signal RD and the address signal ADD.

The adder 940 may add the computation value outputted from the selector 920 to a value corresponding to computation information read from the memory 930. The adder 940 may add a computation value outputted from an overflowing processing element by the selector 920 to a value corresponding to computation information read from the storage space corresponding to the processing element. The adder 940 may add the computation values OA1 to OA7 for the first input signals of the first to seventh processing elements PE1 to PE7 (i.e., the first input signal INA1 in the first processing element PE1, the third input signal INA2 in the second processing element PE2, the fifth input signal INA3 in the third processing element PE3, and the 13th input signal INA7 in the seventh processing element PE7) to values corresponding to the computation information SA1 to SA7 related to the first input signals in the read computation information, respectively. The adder 940 may add the computation values OB1 to 0B7 for the second input signals of the first to seventh processing elements PE1 to PE7 (i.e., the second input signal INB1 in the first processing element PE1, the fourth input signal INB2 in the second processing element PE2, the sixth input signal INB3 in the third processing element PE3, and the 14th input signal INB7 in the seventh processing element PE7) to values corresponding to the computation information SB1 to SB7 related to the second input signals in the read computation information, respectively. The memory 930 may update the first to seventh computation information SA1/SB1 to SA7/SB7 stored in the first to seventh storage spaces 931 to 937 by storing outputs of the adder 940 in storage spaces corresponding to the address signal ADD based on the write command signal WT.

When the computation operation of the computation circuit is ended, the controller 910 may generate the read command signal RD a plurality of times, and sequentially generate the address signal ADD for accessing the first to seventh storage spaces 931 to 937. The memory 930 may sequentially output the first to seventh computation information SA1/SB1 to SA7/SB7 stored in the first to seventh storage spaces 931 to 937, based on the plurality of read command signals RD and the address signal ADD for accessing the first to seventh storage spaces 931 to 937. The computation information SA1 to SA7 related to the first input signals of the first to seventh processing elements PE1 to PE7 among the first to seventh computation information SA1/SB1 to SA7/SB7 may be outputted as a first output signal OUTA. The computation information SB1 to SB7 related to the second input signals of the first to seventh processing elements PE1 to PE7 among the first to seventh computation information SA1/SB1 to SA7/SB7 may be outputted as a second output signal OUTB.

Figure 10:
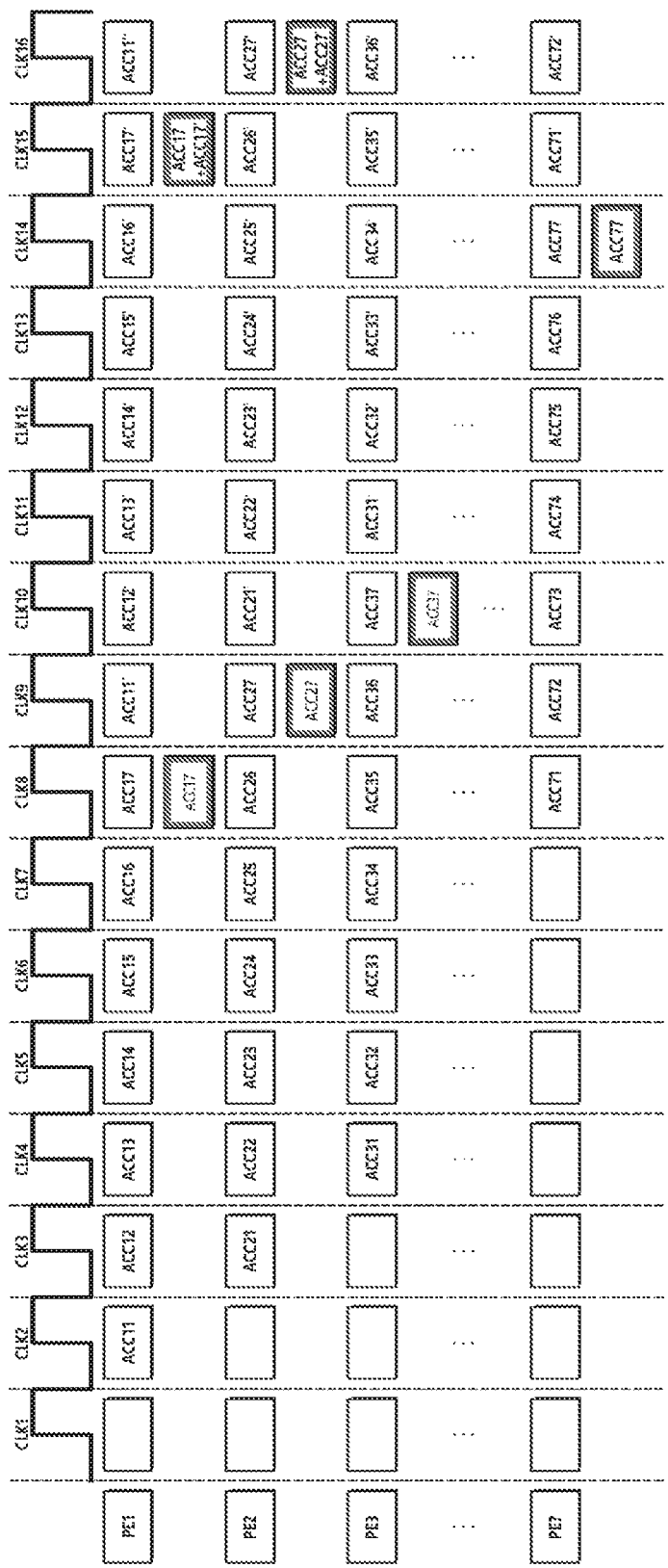
FIG. 10 is a timing diagram illustrating an operation of the computation circuit in accordance with an embodiment.

FIG. 10 is a timing diagram illustrating an operation of a computation circuit in accordance with an embodiment. Operation of the computation circuit is described with reference to FIGS. 6 to 10. The plurality of processing elements constituting the computation circuit may each receive two input signals having the second precision, and perform a MAC operation on the two input signals at the same time. When the bit number of the input signal inputted to each of the processing elements is eight, the number of guard bits is two, and the input signal represents an integer between −128 and 127, one processing element may perform seven MAC operations until the processing element overflows, and seven processing elements may be coupled to one common accumulator to perform MAC operations. As illustrated in FIG. 7, the operation of the computation circuit 700 in which the first to seventh processing elements PE1 to PE7 are coupled to the common accumulator 710 or 900 is described.

When a first clock signal CLK1 toggles during a first unit cycle, the first processing element PE1 may receive a first input signal INA1, a second input signal INB1 and a weight signal W. The first processing element PE1 may multiply the first input signal INA1 by the weight signal W, and multiply the second input signal INB1 by the weight signal W.

When a second clock signal CLK2 toggles during a second unit cycle, the first processing element PE1 may newly receive the first input signal INA1, the second input signal INB1 and the weight signal W, and transfer the weight signal W inputted during the first unit cycle to the second processing element PE2. The second processing element PE2 may receive a third input signal INA2, a fourth input signal INB2, and the weight signal W from the first processing element PE1. The first processing element PE1 may store the computation value generated through the multiplication in the first unit cycle. The first processing element PE1 may add the computation value generated through the multiplication in the first unit cycle to the previously stored computation value, i.e., a value of 0, and store the sum computation value ACC11 in the output register. The first processing element PE1 may multiply the first input signal INA by the weight signal W, and multiply the second input signal INB1 by the weight signal W. The second processing element PE2 may multiply the third input signal INA2 by the weight signal W, and multiply the fourth input signal INB2 by the weight signal W.

When a third clock signal CLK3 toggles during a third unit cycle, the first processing element PE1 may newly receive the first input signal INA1, the second input signal INB1 and the weight signal W, and transfer the weight signal W inputted during the second unit cycle to the second processing element PE2. The second processing element PE2 may newly receive the third input signal INA2 and the fourth input signal INB2, and transfer the weight signal W inputted during the second unit cycle to the third processing element PE3. The third processing element PE3 may receive a fifth input signal INA3, a sixth input signal INB3, and the weight signal W from the second processing element PE2. The first processing element PE1 may add the computation value ACC11 accumulated in the second unit cycle and the computation value generated through the multiplication in the third cycle, and store the sum computation value ACC12 in the output register. The first processing element PE1 may multiply the first input signal INA1 by the weight signal W, and multiply the second input signal INB1 by the weight signal W. The second processing element PE2 may store the computation value generated through the multiplication in the second unit cycle. The second processing element PE2 may add the computation value generated through the multiplication in the second unit cycle and the previously stored computation value, i.e., a value of 0, and store the sum computation value ACC21 in the output register. The second processing element PE2 may multiply the third input signal INA2 by the weight signal W, and multiply the fourth input signal INB2 by the weight signal W. The third processing element PE3 may multiply the fifth input signal INA3 by the weight signal W, and multiply the sixth input signal INB3 by the weight signal W.

When fourth to eighth clock signals CLK4 to CLK7 respectively toggle during fourth to eighth unit cycles, the first to seventh processing elements PE1 to PE7 may update the computation values by performing MAC operations on the received input signals and the receive weight signals. The computation value stored in the output register of the first processing element PE1 may be sequentially updated into computation values ACC13, ACC14, ACC15, ACC16 and ACC17. The computation value stored in the output register of the second processing element PE2 may be sequentially updated to computation values ACC22, ACC23, ACC24, ACC25 and ACC26. The computation value stored in the output register of the third processing element PE3 may be sequentially updated to computation values ACC31, ACC32, ACC33 and ACC34. During the eighth unit cycle, the seventh processing element PE7 may receive a 13th input signal INA7, a 14th input signal INB7, and the weight signal W from the sixth processing element PE6. The seventh processing element PE7 may multiply the 13th input signal INA7 by the weight signal W, and multiply the 14th input signal INB7 by the weight signal W. During the eighth cycle, the computation value ACC17 stored in the output register of the first processing element PE1 may be outputted to the common accumulator 900. The controller 910 of the common accumulator 900 may enable the first bit SEL<0> of the selection signal based on the counting value from the count register of the first processing element PE1, sequentially generate the read command signal RD and the write command signal WT, and generate the address signal ADD for accessing the first storage space 931. The selector 920 may be coupled to the first processing element PE1, and receive the computation value ACC17 outputted from the output register of the first processing element PE1. The memory 930 may output the first computation information SA1/SB1 stored in the first storage space 931 based on the read command signal RD and the address signal ADD. The first computation information SA1/SB1 may correspond to a value of 0. The adder 940 may add a value of 0 and the received computation value ACC17. The memory 930 may store the output of the adder 940 as the first computation information SA1/SB1 in the first storage space 931 based on the write command signal WT and the address signal ADD.

When a ninth clock signal CLK9 toggles during a ninth unit cycle, the first processing element PE1 may newly receive the first input signal INA1, the second input signal INB1 and the weight signal W. The counting value stored in the count register of the first processing element PE1 may become nine. The selector of the first processing element PE1 may output a value of 0 instead of the previous computation value ACC17 stored in the output register. The first processing element PE1 may multiply the first input signal INA1 by the weight signal W, and multiply the second input signal INB1 by the weight signal W. The adder of the first processing element PE1 may add the computation value generated through the multiplication in the eighth unit cycle and a value of 0 outputted from the selector, and store the computation value ACC11' in the output register of the first processing element PE1. During the ninth cycle, a previous computation value ACC27 stored in the output register of the second processing element PE2 may be outputted to the common accumulator 900. The controller 910 of the common accumulator 900 may enable the second bit SEL<1> of the selection signal based on the counting value from the count register of the first processing element PE1 or the second processing element PE2. Further, the controller 910 may sequentially generate the read command signal RD and the write command signal WT, and generate the address signal ADD for accessing the second storage space 932. The selector 920 may be coupled to the second processing element PE2, and receive the computation value ACC27 outputted from the output register of the second processing element PE2. The memory 930 may output the second computation information SA2/SB2 stored in the second storage space 932 based on the read command signal RD and the address signal ADD. The second computation information SA2/SB2 may correspond to a value of 0, and the adder 940 may accumulate a value of 0 and the received computation value ACC27. The memory 930 may store an output of the adder 940 as the second computation information SA2/SB2 in the second storage space 932 based on the write command signal WT and the address signal ADD.

When a tenth clock signal CLK10 toggles during a tenth unit cycle, the second processing element PE2 may newly receive the third input signal INA2, the fourth input signal INB2 and the weight signal W from the first processing element PE1. The counting value stored in the count register of the second processing element PE2 may become nine, and the selector of the second processing element PE2 may output 0 instead of the previous computation value ACC27 stored in the output register. The second processing element PE2 may multiply the third input signal INA2 by the weight signal W, and multiply the fourth input signal INB2 by the weight signal W. The adder of the second processing element PE2 may add the computation value generated through the multiplication in the ninth unit cycle and a value of 0 outputted from the selector. Further, the adder may store the computation value ACC21' in the output register of the second processing element PE2. During the tenth cycle, a previous computation value ACC37 stored in the output register of the third processing element PE3 may be outputted to the common accumulator 900. The controller 910 of the common accumulator 900 may enable the third bit SEL<2> of the selection signal based on the counting value from the count register of the first processing element PE1 or the third processing element PE3. Further, the controller 910 may sequentially generate the read command signal RD and the write command signal WT, and generate the address signal ADD for accessing the third storage space 933. The selector 920 may be coupled to the third processing element PE3, and receive the computation value ACC37 outputted from the output register of the third processing element PE3. The memory 930 may output the third computation information SA3/SB3 stored in the third storage space 933 based on the read command signal RD and the address signal ADD. The third computation information SA3/SB3 may correspond to a value of 0. The adder 940 may add a value of 0 and the received computation value ACC37. The memory 930 may store an output of the adder 940 as the third computation information SA3/SB3 in the third storage space 933 based on the write command signal WT and the address signal ADD.

When an 11th clock signal CLK11 toggles during an 11th unit cycle, the third processing element PE3 may newly receive the fifth input signal INA3, the sixth input signal INB3 and the weight signal W from the second processing element PE2. The counting value stored in the count register of the third processing element PE3 may become nine. The selector of the third processing element PE3 may output a value of 0 instead of the previous computation value ACC37 stored in the output register. The third processing element PE3 may multiply the fifth input signal INA3 by the weight signal W, and multiply the sixth input signal INB3 by the weight signal W. The adder of the third processing element PE3 may add the computation value generated through the multiplication in the tenth unit cycle and a value of 0 outputted from the selector. Further, the adder may store the computation value ACC31' in the output register of the third processing element PE3.

When a 14th clock signal CLK14 toggles during a 14th unit cycle, a computation value ACC77 outputted from the seventh processing element PE7 may be stored as the seventh computation information SA7/SB7 of the common accumulator in the seventh storage space 937.

When a 15th clock signal CLK15 toggles during a 15th unit cycle, a previous computation value ACC17' stored in the output register of the first processing element PE1 may be outputted to the common accumulator 900. The controller 910 of the common accumulator 900 may enable the first bit SEL<0> of the selection signal based on the counting value transferred from the count register of the first processing element PE1. Further, the controller 910 may sequentially generate the read command signal RD and the write command signal WT, and generate the address signal ADD for accessing the first storage space 931. The selector 920 may be coupled to the first processing element PE1, and receive the computation value ACC17' outputted from the output register of the first processing element PE1. The memory 930 may output the previous first computation information SA1/SB1 stored in the first storage space 931 based on the read command signal RD and the address signal ADD. The adder 940 may add the computation value ACC17 corresponding to the first computation information SA1/SB1 stored in the first storage space 931 and the received computation value ACC17'. The memory 930 may store the computation value ACC17+ACC17' as new first computation information SA1/SB1 in the first storage space 931 based on the write command signal WT and the address signal ADD.

During a 16th unit cycle, the counting value stored in the count register of the first processing element PE1 may become 16, and the selector of the first processing element PE1 may output 0 instead of the previous computation value ACC17' stored in the output register. The first processing element PE1 may perform a MAC operation on the first input signal INA1 and the weight signal W, and perform a MAC operation on the second input signal INB1 and the weight signal W. The adder of the first processing element PE1 may add a computation value generated through the MAC operation and a value of 0 outputted from the selector, and store the computation value ACC11" in the output register of the first processing element PE1. During 16th unit cycle, the common accumulator 900 may accumulate the computation value ACC27' outputted from the second processing element PE2 and the value corresponding to the second computation information SA2/SB2 stored in the second storage space 932. Further, the common accumulator 900 may update the second computation information SA2/SB2 to the computation value ACC27+ACC27'.

The first to seventh processing elements PE1 to PE7 may repeatedly perform a number of MAC operations corresponding to the threshold value, and then output the computation value to the common accumulator 900. The common accumulator 900 may be sequentially coupled to the first to seventh processing elements PE1 to PE7. Further, the common accumulator 900 may receive computation values from the first to seventh processing elements PE1 to PE7, and update the computation information corresponding to the respective processing elements. Therefore, in an embodiment, one processing element may perform a MAC operation on a plurality of input signals having low precision, thereby increasing the efficiency and performance of the computation circuit. The output register of each of the processing elements may have the guard bits, such that the computation value for the second input signal of the corresponding processing element within the storage space of the output register has no influence on the computation value for the first input signal. When the number of the guard bits is adjusted, the number of processing elements coupled to one common accumulator may be adjusted, which makes it possible to constitute a computation circuit having an efficient area. Furthermore, it is possible to reduce the time and power required for processing the same amount of data.

While various embodiments have been illustrated and described above, it will be understood to those skilled in the art in light of the present disclosure that the embodiments described are examples only. Accordingly, the present invention is not limited to or by the described embodiments. Rather, the present invention encompasses all modifications and variations of any of the disclosed embodiments to the extent they fall within the scope of the claims and their equivalents.

What is claimed is:

1. A computation circuit comprising:
a plurality of processing elements sequentially coupled in series, and configured to perform a multiply and accumulate (MAC) operation on a weight signal and at least one of two or more input signals received in each unit cycle, wherein the at least one of two or more input signals which the plurality of processing elements respectively receive are different from one another; and
a common accumulator sequentially and cyclically coupled to first to Kth processing elements among the plurality of processing elements, and configured to receive a computation value outputted from a processing element among the first to Kth processing elements, and store computation information including the computation value,
wherein K is determined based on values of the two or more input signals and the number of guard bits corresponding to one processing element.

2. The computation circuit according to claim 1, wherein each of the processing elements receives one input signal having a first number of bits during a first computation operation, and receives two or more input signals each having a second number of bits during a second computation operation,
wherein the maximum value of the first number is greater than or equal to (2X−1)*N, where X represents the number of the input signals and N represents the second number.

3. The computation circuit according to claim 1, wherein when each of the two or more input signals includes N bits, the number of the guard bits is G, and each of the two or more input signals is represented by an integer between $-2^{N-1}$ and $2^{N-1}-1$, where K is an integer less than or equal to $(2^{2N+G-1}-1)/(2^{2(N-1)})$.

4. The computation circuit according to claim 1, wherein when each of the two or more input signals includes N bits, the number of the guard bits is G, and each of the two or more input signal is represented by an integer between $-2^{N-1}$ and $2^{N-1}-1$, where K is an integer less than or equal to $(2^{2N+G-1}-1)/(2^{2(N-1)}-2^N+1)$.

5. The computation circuit according to claim 1, wherein the two or more input signals comprise a first input signal and a second input signal, and at least one of the plurality of processing elements comprises an output register configured to store the computation value,
  wherein the output register comprises a storage space for storing a plurality of bits, stores a computation value for the second input signal and the weight signal in first to (M+G)th bits of the storage space, and stores a computation value for the first input signal and the weight signal in (M+G+1)th to (2M+2G) bits of the storage space, where M represents the sum of a number of bits of one of the first and second input signals and a number of bits of the weight signal, and G corresponds to the number of guard bits.

6. The computation circuit according to claim 1, wherein the two or more input signals comprise a first input signal and a second input signal,
  wherein at least one of the plurality of processing elements comprises:
    an input register configured to store the first and second input signals inputted in each unit cycle;
    a weight register configured to store the weight signal;
    an output register configured to store the computation value;
    a multiplier configured to multiply the first input signal by the weight signal, and multiply the second input signal by the weight signal;
    an overflow controller configured to count the number of times that the weight signal is inputted, and output one of a value of 0 and the computation value stored in the output register based on the counting value; and
    an adder configured to update the computation value by adding an output of the multiplier and the output of the overflow controller.

7. The computation circuit according to claim 6, wherein the input register comprises a storage space for storing a plurality of bits,
  wherein the input register sequentially stores the second input signal in first to Nth bits of the storage space, and stores the first input signal in (N+G)th to (2N+G)th bits of the storage space, where N corresponds to a number of bits of the first or second input signal, and G corresponds to the number of guard bits.

8. The computation circuit according to claim 6, wherein the overflow controller outputs the computation value stored in the output register, when the counting value is less than or equal to a threshold value, and outputs a value of 0 when the counting value exceeds the threshold value.

9. The computation circuit according to claim 6, wherein the overflow controller comprises:
  a counter configured to count the number of times that the weight signal is inputted;
  a count register configured to store the counting value of the counter; and
  a selector configured to output one of a value of 0 and the computation value stored in the output register based on the counting value.

10. The computation circuit according to claim 1, wherein the common accumulator comprises:
  a controller configured to generate a selection signal, a command signal and an address signal based on whether the number of accumulations in each of the processing elements has reached a threshold value;
  a selector configured to output one of computation values outputted from the first to Kth processing elements based on the selection signal;
  a memory configured to output one of first to Kth computation information based on the command signal and the address signal; and
  an adder configured to add the output of the selector and the output of the memory,
  wherein the memory stores an output of the adder as the first to Kth computation information.

11. A computation circuit comprising:
  a plurality of processing elements, each configured to receive at least one of two or more input signals in each unit cycle, and perform a multiply and accumulate (MAC) operation on a weight signal and at least one of the two or more input signals to generate a computation value, wherein the at least one of two or more input signals which the plurality of processing elements respectively receive are different from one another; and
  a common accumulator configured to store computation values generated by the plurality of processing elements as plural pieces of computation information, respectively, coupled to each of the plurality of processing elements in each unit cycle in which the number of accumulations in the corresponding processing element reaches a threshold value, and configured to update computation information related to one processing element among the plurality of processing elements by accumulating a computation value outputted from the one processing element and a value corresponding to the computation information related to the one processing element.

12. The computation circuit according to claim 11, wherein each of the processing elements receives one input signal having a first bit number during a first computation operation, and receives two or more input signals each having a second bit number during a second computation operation,
  wherein the maximum value of the first number of bits is greater than or equal to $(2X-1)*N$, where X represents the number of the input signals, and N represents the second number of bits.

13. The computation circuit according to claim 11, wherein first to Kth processing elements among the plurality of processing elements are coupled to the common accumulator in common,
  wherein, when each of the two or more input signals includes N bits, the number of the guard bits is G, and each of the two or more input signals is represented by an integer between $-2^{N-1}$ and $2^{N-1}-1$, K is an integer less than or equal to $(2^{2N+G-1}-1)/(2^{2(N-1)})$.

14. The computation circuit according to claim 11, wherein first to Kth processing elements among the plurality of processing elements are coupled to the common accumulator in common,
  wherein, when each of the two or more input signals includes N bits, the number of the guard bits is G, and each of the two or more input signals is represented by an integer between $-2^{N-1}$ and $2^{N-1}-1$, K is an integer less than or equal to $(2^{2N+G-1}-1)/(2^{2(N-1)}-2^N+1)$.

15. The computation circuit according to claim 11, wherein the two or more input signals comprise a first input signal and a second input signal, and at least one of the plurality of processing elements comprises an output register configured to store the computation value, wherein the output register comprises a storage space for storing a plurality of bits, stores a computation value for the second input signal and the weight signal in first to (M+G)th bits of the storage space, and stores a computation value for the first input signal and the weight signal in (M+G+1)th to (2M+2G) bits of the storage space, where M represents the sum of a number of bits of one of the first and second input signals and a number of bits of the weight signal, and G corresponds to the number of guard bits.

16. The computation circuit according to claim 11, wherein the two or more input signals comprise a first input signal and a second input signal,
wherein at least one of the plurality of processing elements comprises:
an input register configured to store the first and second input signals inputted in each unit cycle;
a weight register configured to store the weight signal;
an output register configured to store the computation value;
a multiplier configured to multiply the first input signal by the weight signal, and multiply the second input signal by the weight signal;
an overflow controller configured to count the number of times that the weight signal is inputted, and output one of a value of 0 and the computation value stored in the output register based on the counting value; and
an adder configured to update the computation value by accumulating an output of the multiplier and the output of the overflow controller.

17. The computation circuit according to claim 16, wherein the input register comprises a storage space for storing a plurality of bits,
wherein the input register sequentially stores the second input signal in first to Nth bits of the storage space, and stores the first input signal in (N+G)th to (2N+G)th bits of the storage space, where N corresponds to a number of bits of the first or second input signal, and G corresponds to the number of guard bits.

18. The computation circuit according to claim 16, wherein the overflow controller outputs the computation value stored in the output register, when the counting value is less than or equal to a threshold value, and outputs a value of 0 when the counting value exceeds the threshold value.

19. The computation circuit according to claim 16, wherein the overflow controller comprises:
a counter configured to count the number of times that the weight signal is inputted;
a count register configured to store the counting value of the counter; and
a selector configured to output one of a value of 0 and the computation value stored in the output register based on the counting value.

20. The computation circuit according to claim 11, wherein the common accumulator comprises:
a controller configured to generate a selection signal, a command signal and an address signal based on whether the number of accumulations in each of the processing elements has reached a threshold value;
a selector configured to output one of computation values outputted from the first to Kth processing elements based on the selection signal;
a memory configured to output one of first to Kth computation information based on the command signal and the address signal; and
an adder configured to add the output of the selector and the output of the memory,
wherein the memory stores an output of the adder as the first to Kth computation information.

* * * * *